US011617071B2

(12) United States Patent
Kang et al.

(10) Patent No.: US 11,617,071 B2
(45) Date of Patent: Mar. 28, 2023

(54) ELECTRONIC APPARATUS FOR CONTROLLING A PLURALITY OF ELECTRONIC APPARATUSES THROUGH WIRELESS COMMUNICATION AND CONTROLLING METHOD THEREOF

(71) Applicant: Samsung Electronics Co., Ltd., Suwon-si (KR)

(72) Inventors: Mijo Kang, Suwon-si (KR); Jongjin Ko, Suwon-si (KR); Yongwook Kim, Suwon-si (KR); Kyungah Chang, Suwon-si (KR); Sangjin Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 112 days.

(21) Appl. No.: 17/074,886

(22) Filed: Oct. 20, 2020

(65) Prior Publication Data

US 2021/0127251 A1 Apr. 29, 2021

(30) Foreign Application Priority Data

Oct. 29, 2019 (KR) .................. 10-2019-0135297

(51) Int. Cl.
*H04W 8/00* (2009.01)
*H04W 24/10* (2009.01)
(Continued)

(52) U.S. Cl.
CPC ......... *H04W 8/005* (2013.01); *H04L 12/2816* (2013.01); *H04L 41/22* (2013.01);
(Continued)

(58) Field of Classification Search
CPC ..... H04W 48/14; H04W 48/16; H04W 4/023; H04W 24/02; H04W 28/16; H04W 12/02; H04W 72/12; H04W 36/04
(Continued)

(56) References Cited

U.S. PATENT DOCUMENTS 6,952,181 B2 * 10/2005 Karr ...................... G01S 5/021
342/453
8,446,853 B2    5/2013 Umeda et al.
(Continued)

FOREIGN PATENT DOCUMENTS

CN     110176234 A     8/2019
EP        3531273 B1 *  9/2021  ........... G06F 3/1204
(Continued)

OTHER PUBLICATIONS

A. A. Kalbandhe and S. C. Patil, "Indoor Positioning System using Bluetooth Low Energy," 2016 International Conference on Computing, Analytics and Security Trends (CAST), Dec. 2016, pp. 451-455, doi: 10.1109/CAST.2016.7915011. (Year: 2016).*
(Continued)

*Primary Examiner* — William D Cumming
(74) *Attorney, Agent, or Firm* — Jefferson IP Law, LLP

(57) ABSTRACT

An electronic apparatus is provided. The electronic apparatus includes a first communication interface, a second communication interface, and a processor configured to control the first communication interface to connect to a Bluetooth™ low energy (BLE) network, and based on receiving a wireless fidelity (Wi-Fi) signal from an access point (AP) apparatus through the second communication interface, identify a strength of the received Wi-Fi signal, transmit information on the strength of the received Wi-Fi signal to the AP apparatus through the second communication interface, and based on receiving response information corre-
(Continued)

sponding to the information transmitted from the AP apparatus through the second communication interface, identify whether the electronic apparatus is a main apparatus among a plurality of electronic apparatuses connected to the BLE network based on the received response information, and maintain Wi-Fi communication through the second communication interface or release the Wi-Fi communication based on the identification result.

22 Claims, 21 Drawing Sheets

(51) Int. Cl.
  *H04L 41/22* (2022.01)
  *H04W 4/80* (2018.01)
  *H04L 12/28* (2006.01)
  *H04W 48/20* (2009.01)

(52) U.S. Cl.
  CPC ............ *H04W 4/80* (2018.02); *H04W 24/10* (2013.01); *H04W 48/20* (2013.01)

(58) Field of Classification Search
  USPC ........................................................ 455/434
  See application file for complete search history.

(56) References Cited

U.S. PATENT DOCUMENTS

| | | | |
|---|---|---|---|
| 8,792,371 | B2 | 7/2014 | Woo |
| 9,445,358 | B2* | 9/2016 | Ishikawa ............... H04W 48/16 |
| 10,249,122 | B1 | 4/2019 | Aksamit et al. |
| 10,368,255 | B2* | 7/2019 | Gunasekara ......... H04B 17/318 |
| 10,516,552 | B2* | 12/2019 | Park ...................... H04W 36/04 |
| 10,686,856 | B1* | 6/2020 | Straitiff .............. H04N 21/4227 |
| 10,707,949 | B2* | 7/2020 | Shiobara ............... H04W 28/16 |
| 11,273,913 | B2* | 3/2022 | Waters ................. B60L 53/126 |
| 11,456,904 | B2* | 9/2022 | Gurelli ............. H04L 27/26025 |
| 2011/0019606 | A1* | 1/2011 | Umeda ................ H04W 24/02 |
| | | | 455/11.1 |
| 2011/0082939 | A1* | 4/2011 | Montemurro ........... H04L 69/24 |
| | | | 709/227 |
| 2012/0106375 | A1* | 5/2012 | Woo ...................... H04W 84/20 |
| | | | 370/252 |
| 2015/0141008 | A1* | 5/2015 | Ishikawa ............... H04W 48/16 |
| | | | 455/434 |
| 2017/0127114 | A1* | 5/2017 | Lee .................... H04N 21/4882 |
| 2017/0245110 | A1* | 8/2017 | Ruiz ...................... H04W 4/023 |
| 2018/0063802 | A1* | 3/2018 | Kashef ................... H04R 27/00 |
| 2018/0115438 | A1* | 4/2018 | Park ....................... H04W 40/16 |
| 2019/0037418 | A1* | 1/2019 | Gunasekara .......... H04W 24/02 |
| 2019/0089453 | A1* | 3/2019 | Shiobara ............... H04W 28/16 |
| 2019/0138752 | A1* | 5/2019 | Yoon .................... H04W 12/02 |
| 2019/0208395 | A1* | 7/2019 | Chau .................... H04B 7/0617 |
| 2021/0127251 | A1* | 4/2021 | Kang .................. H04L 12/2874 |
| 2021/0328843 | A1* | 10/2021 | Gurelli ............. H04L 27/26025 |
| 2021/0392649 | A1* | 12/2021 | Kim ...................... H04W 88/06 |
| 2022/0007374 | A1* | 1/2022 | Sevindik ............. H04W 72/085 |
| 2022/0053586 | A1* | 2/2022 | Purkayastha ......... H04W 76/15 |
| 2022/0070166 | A1* | 3/2022 | Aunger ................. G06F 21/316 |
| 2022/0085860 | A1* | 3/2022 | Bali ..................... H04B 7/0634 |
| 2022/0095319 | A1* | 3/2022 | Duan .................... G01S 13/003 |
| 2022/0113395 | A1* | 4/2022 | Lee ........................ H04W 4/021 |
| 2022/0240118 | A1* | 7/2022 | Bao ....................... H04L 5/0051 |

FOREIGN PATENT DOCUMENTS

| | | | | |
|---|---|---|---|---|
| JP | 2011-029990 | A | | 2/2011 |
| JP | 2013-030867 | A | | 2/2013 |
| JP | 2016-009888 | A | | 1/2016 |
| JP | 2017-157991 | A | | 9/2017 |
| JP | 6529652 | B1 | | 6/2019 |
| KR | 10-2008-0023465 | A | | 3/2008 |
| KR | 10-2012-0046547 | A | | 5/2012 |
| KR | 10-2012-0089479 | A | | 8/2012 |
| KR | 10-2018-0109324 | A | | 10/2018 |
| KR | 10-1981312 | B1 | | 5/2019 |
| KR | 10-2007487 | B1 | | 8/2019 |
| WO | WO-2013067569 | A1 | * | 5/2013 ............ G05B 15/02 |
| WO | WO-2019012528 | A1 | * | 1/2019 |

OTHER PUBLICATIONS

D. Namiotand M. Sneps-Sneppe, "On Content Models for Proximity Services," 2019 24th Conference of Open Innovations Association (FRUCT), 2019, pp. 277-284, doi: 10.23919/FRUCT.2019.8711983. (Year: 2019).*

International Search Report dated Feb. 15, 2021, issued in International Application No. PCT/KR2020/014452.

* cited by examiner

ELECTRONIC APPARATUS FOR CONTROLLING A PLURALITY OF ELECTRONIC APPARATUSES THROUGH WIRELESS COMMUNICATION AND CONTROLLING METHOD THEREOF

CROSS-REFERENCE TO RELATED APPLICATION(S)

This application is based on and claims priority under 35 U.S.C. § 119(a) of a Korean patent application number 10-2019-0135297, filed on Oct. 29, 2019 in the Korean Intellectual Property Office, the disclosure of which is incorporated by reference herein in its entirety.

BACKGROUND

1. Field

The disclosure relates to an electronic apparatus and a controlling method thereof. More particularly, the disclosure relates to an electronic apparatus that controls a plurality of electronic apparatuses through wireless communication, and a controlling method thereof.

2. Description of Related Art

In general, for controlling a plurality of home appliances, wireless communication technologies, such as wireless fidelity (Wi-Fi) are used.

In particular, in Internet of Things (IoT) technologies, a Wi-Fi technology using a router for controlling various home appliances is being used widely. By using the same router, a user can control various home appliances that can recognize a Wi-Fi signal transmitted from the router.

Here, in the case of controlling home appliances by using only Wi-Fi, there may be a problem that home appliances using near field wireless communication methods, such as Bluetooth™, Zigbee™, Z-wave, and the like, cannot be controlled directly.

Here, a user accesses a server for controlling various home appliances by a terminal apparatus. The server is connected with a router, and an instruction that the user transmitted to the server is transmitted to a plurality of home appliances through the router. In order that the instruction transmitted from the server can be transmitted to a plurality of home appliances through the router, the plurality of home appliances should be connected with the server through the router. Specifically, the user has to directly search home appliances to be connected with the server and transmit an instruction for connection at the terminal apparatus. When a home appliance is initially installed, the home appliance is not automatically connected with the server even though the power of the home appliance is turned on, and thus there may be inconvenience that the user has to perform a connecting operation directly.

In addition, as the plurality of home appliances should be connected with the server through the router, the plurality of home appliances should be in a stand-by state so that they can always receive a Wi-Fi signal and respond. Here, there is a problem that the standby power of the plurality of home appliances increases. In actuality, it takes a short time for the plurality of home appliances to receive a Wi-Fi signal and respond, but the plurality of home appliances should always be in a connected state with the server, and thus the plurality of home appliances should always supply power to a communication interface related with Wi-Fi. Accordingly, there may be a problem that the plurality of home appliances consume a lot of standby power.

In addition, in the case of transmitting a Wi-Fi signal through the router, there is a problem that a Wi-Fi signal is not caught according to a distance and a structure. For example, there may be a case wherein a Wi-Fi signal is not caught normally for a home appliance located beyond a specific distance or a home appliance located in a space consisting of walls in a complex structure. In case a Wi-Fi signal is not caught normally, there may be a problem that it is difficult for the user to control home appliances through the terminal apparatus.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic apparatus controlling a plurality of electronic apparatuses by using different wireless communication technologies, and a controlling method thereof.

Additional aspects will be set forth in part in the description which follows and, in part, will be apparent from the description, or may be learned by practice of the presented embodiments.

In accordance with an aspect of the disclosure, an electronic apparatus is provided. The electronic apparatus includes a first communication interface, a second communication interface, and a processor configured to control the first communication interface to connect to a Bluetooth™ low energy (BLE) network, and based on receiving a wireless fidelity (Wi-Fi) signal from an access point (AP) apparatus through the second communication interface, identify a strength of the received Wi-Fi signal, transmit information on the strength of the received Wi-Fi signal to the AP apparatus through the second communication interface, and based on receiving response information corresponding to the information transmitted from the AP apparatus through the second communication interface, identify whether the electronic apparatus is a main apparatus among a plurality of electronic apparatuses connected to the BLE network based on the received response information, and maintain Wi-Fi communication through the second communication interface or release the Wi-Fi communication based on a result of the identified strength of the received Wi-Fi signal.

In accordance with another aspect of the disclosure, a controlling method of an electronic apparatus is provided. The controlling method includes the operations of controlling the first communication interface to connect to a BLE network, based on receiving a Wi-Fi signal from an AP apparatus through the second communication interface, identifying a strength of the received Wi-Fi signal, transmitting information on the strength of the received Wi-Fi signal to the AP apparatus through the second communication interface, based on receiving response information corresponding to the information transmitted from the AP apparatus through the second communication interface, identifying whether the electronic apparatus is a main apparatus among a plurality of electronic apparatuses connected to the BLE network based on the received response information, and maintaining Wi-Fi communication through the second communication interface or releasing the Wi-Fi communication based on a result of the identified strength of the received Wi-Fi signal.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
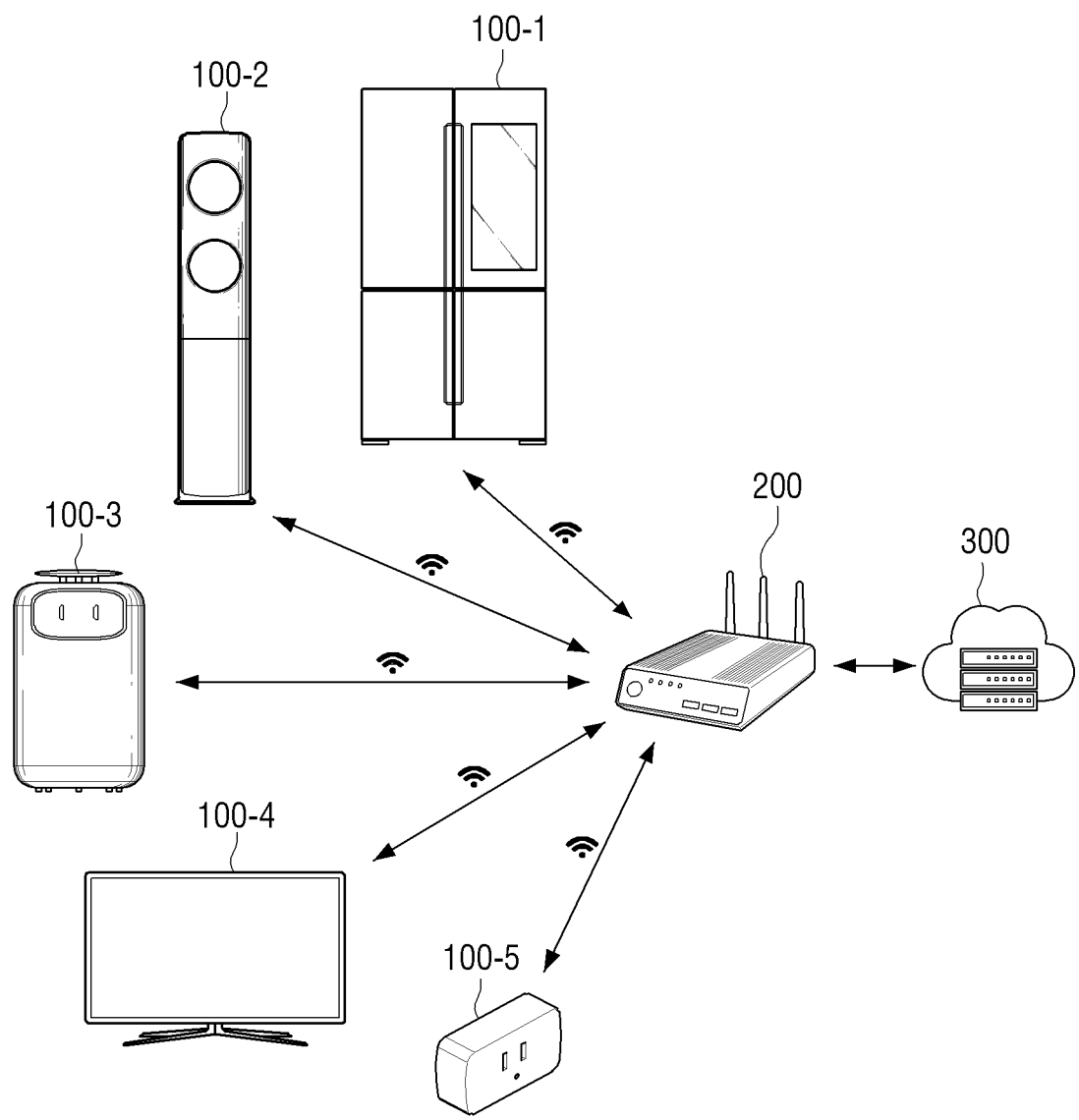
FIG. 1 is a diagram for illustrating a remote control system controlling a plurality of electronic apparatuses by using wireless fidelity (Wi-Fi) according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In this specification, expressions, such as "have," "may have," "include," and "may include" should be construed as denoting that there are such characteristics (e.g., elements, such as numerical values, functions, operations, and components), and the expressions are not intended to exclude the existence of additional characteristics.

In addition, the expression "at least one of A and/or B" should be interpreted to mean any one of "A" or "B" or "A and B."

In addition, the expressions "first," "second" and the like used in this specification may be used to describe various elements regardless of any order and/or degree of importance. In addition, such expressions are used only to distinguish one element from another element, and are not intended to limit the elements.

Further, the description in the disclosure that one element (e.g., a first element) is "(operatively or communicatively) coupled with/to" or "connected to" another element (e.g., a second element) should be interpreted to include both the case where the one element is directly coupled to the another element, and the case where the one element is coupled to the another element through still another element (e.g., a third element).

Meanwhile, singular expressions include plural expressions, as long as they do not obviously mean differently in the context. In addition, in the disclosure, terms, such as "include" and "consist of" should be construed as designating that there are such characteristics, numbers, operations, elements, components or a combination thereof described in the specification, but not as excluding in advance the existence or possibility of adding one or more of other characteristics, numbers, operations, elements, components or a combination thereof.

In addition, in the disclosure, "a module" or "a part" performs at least one function or operation, and may be implemented as hardware or software, or as a combination of hardware and software. Further, a plurality of "modules" or "parts" may be integrated into at least one module and implemented as at least one processor (not shown), except "modules" or "parts" which need to be implemented as specific hardware.

In addition, in this specification, the term "user" may refer to a person who uses an electronic apparatus or an apparatus using an electronic apparatus (e.g., an artificial intelligence electronic apparatus).

Hereinafter, an embodiment of the disclosure will be described with reference to the accompanying drawings.

FIG. 1 is a diagram for illustrating a remote control system controlling a plurality of electronic apparatuses by using Wi-Fi according to an embodiment of the disclosure.

Referring to FIG. 1, a remote control system may include a plurality of electronic apparatuses 100-1, 100-2, 100-3, 100-4, 100-5, an AP apparatus 200, and a server 300.

The plurality of electronic apparatuses 100-1, 100-2, 100-3, 100-4, 100-5 may be electronic apparatuses which are subjects of remote control. Specifically, the plurality of electronic apparatuses 100-1 to 100-5 may be various Internet of Things (IoT) apparatuses controlled through the server 300.

The access point (AP) apparatus 200 may be a router that transmits and receives a Wi-Fi signal. Specifically, the AP apparatus 200 may perform a function of connecting the plurality of electronic apparatuses 100-1 to 100-5 and the server 300. Here, the AP apparatus 200 may communicate with the plurality of electronic apparatuses 100-1 to 100-5 through a Wi-Fi signal, and the AP apparatus 200 may transmit and receive a signal with the server 300 by using various wired (or wireless) networks.

The server 300 may generate and transmit a control command for the plurality of electronic apparatuses 100-1 to 100-5 through the AP apparatus 200. In addition, the server 300 may receive information on the plurality of electronic apparatuses 100-1 to 100-5 through the AP apparatus 200.

Figure 2:
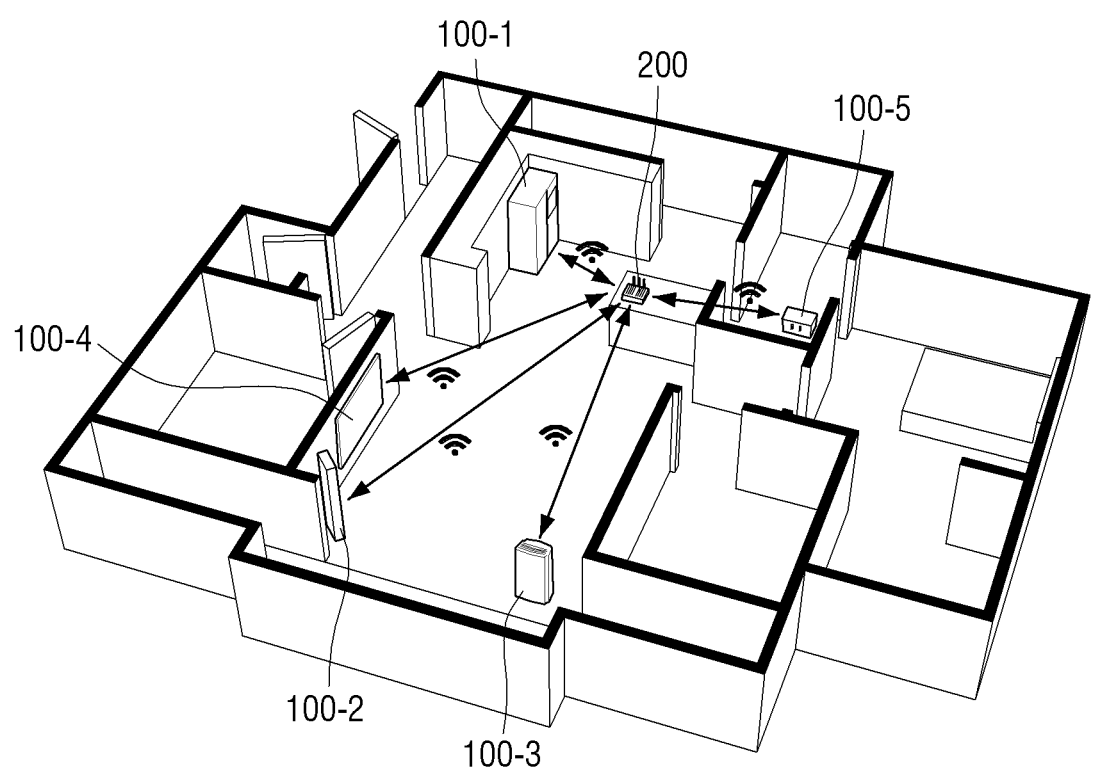
FIG. 2 is a diagram for illustrating a space wherein a remote control system in FIG. 1 is used according to an embodiment of the disclosure.

FIG. 2 is a diagram for illustrating a space wherein a remote control system in FIG. 1 is used according to an embodiment of the disclosure.

Referring to FIG. 2, the plurality of electronic apparatuses 100-1 to 100-5 and the AP apparatus 200 may be arranged in a specific space. The AP apparatus 200 may communicate with each of the plurality of electronic apparatuses 100-1 to 100-5 by using a Wi-Fi signal. Here, the plurality of electronic apparatuses 100-1 to 100-5 transmit and receive information through a Wi-Fi signal, and thus they always have to supply power to a communication interface related with Wi-Fi communication. As the plurality of electronic apparatuses 100-1 to 100-5 always have to supply power to a communication interface related with Wi-Fi communication, a lot of standby power may be consumed.

Figure 3:
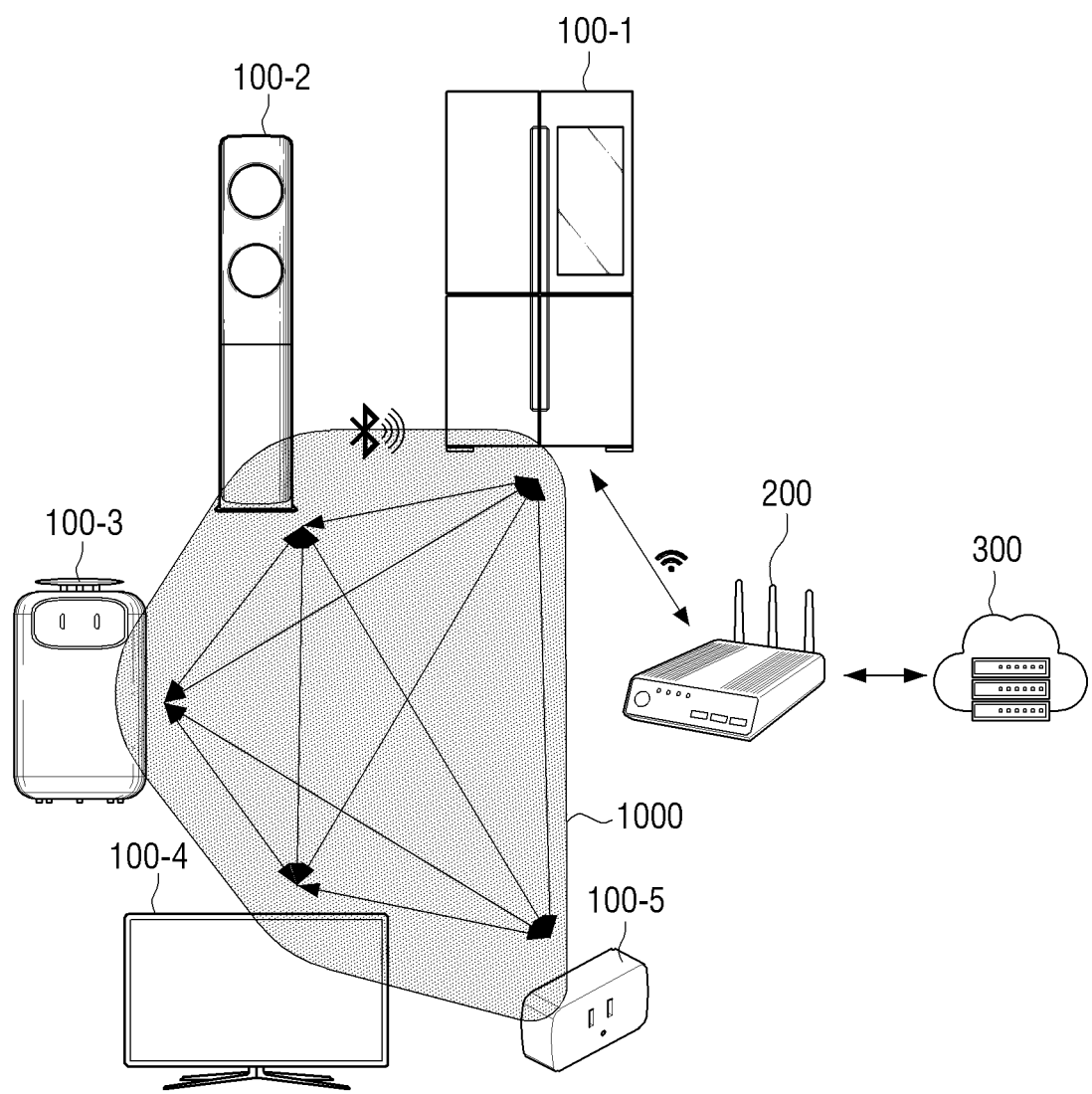
FIG. 3 is a diagram for illustrating a remote control system controlling a plurality of electronic apparatuses by using Wi-Fi and Bluetooth™ low energy (BLE) according to an embodiment of the disclosure.

FIG. 3 is a diagram for illustrating a remote control system controlling a plurality of electronic apparatuses by using Wi-Fi and Bluetooth™ Low Energy (BLE) according to an embodiment of the disclosure.

Referring to FIG. 3, the plurality of electronic apparatuses 100-1 to 100-5 may be connected with one another by using a BLE signal. The plurality of electronic apparatuses 100-1 to 100-5 according to FIG. 3 may be electronic apparatuses including a BLE communication module. In addition, depending on embodiments of the disclosure, the plurality of electronic apparatuses 100-1 to 100-5 may be apparatuses additionally including various communication modules, such as a Wi-Fi communication module, Zigbee™, Z-wave, and the like, other than a BLE communication module.

BLE may mean a Bluetooth™ technology which can transmit and receive low power, low capacitance data in a frequency band of 2.4 GHz having a reaching radius of about 10 m. In addition, BLE may be a technology pursuing low power, low cost, and simplicity from a Bluetooth™ wireless communication technology of the related art. The unit of an operation cycle of BLE is 'ms,' and most apparatuses to which BLE is applied operate in a sleep mode, and thus power consumption may be low.

Accordingly, the plurality of electronic apparatuses 100-1 to 100-5 may constitute a network by using a BLE signal with one another, and in this specification, the network is described as 'a BLE network 1000.' For example, the plurality of electronic apparatuses 100-1 to 100-5 may constitute a BLE network 1000, and any one apparatus among the plurality of electronic apparatuses 100-1 to 100-5 may be connected with the AP apparatus 200 through a Wi-Fi signal.

Here, the BLE network 1000 may be a mesh network. A mesh network may mean a network structure having a form of a net. Specifically, a mesh network may mean a network wherein each node (corresponding to the plurality of electronic apparatuses in FIG. 3) can communicate with one another even if they are not connected to the network hub.

Meanwhile, an apparatus connected with the AP apparatus 200 among the plurality of electronic apparatuses 100-1 to 100-5 will be described as 'the main apparatus,' and apparatuses not connected with the AP apparatus 200 among the plurality of electronic apparatuses 100-1 to 100-5 will be described as 'the sub apparatuses.' Referring to FIG. 3, the main apparatus 100-1 may communicate with the AP apparatus 200 through a Wi-Fi signal, and the sub apparatuses 100-2, 100-3, 100-4, 100-5 do not use a Wi-Fi signal, and thus they may not be directly connected with the AP apparatus 200. Accordingly, in order that the sub apparatuses 100-2, 100-3, 100-4, 100-5 can be connected with the AP apparatus 200, they should go through the main apparatus 100-1. For example, the sub apparatuses 100-2, 100-3, 100-4, 100-5 may receive a control command of the server 300 through the main apparatus 100-1 or transmit information through the main apparatus 100-1. Meanwhile, a specific operation of distinguishing the main apparatus 100-1 and the sub apparatuses 100-2 to 100-5 will be described later in FIG. 5 and FIG. 7.

Figure 4:
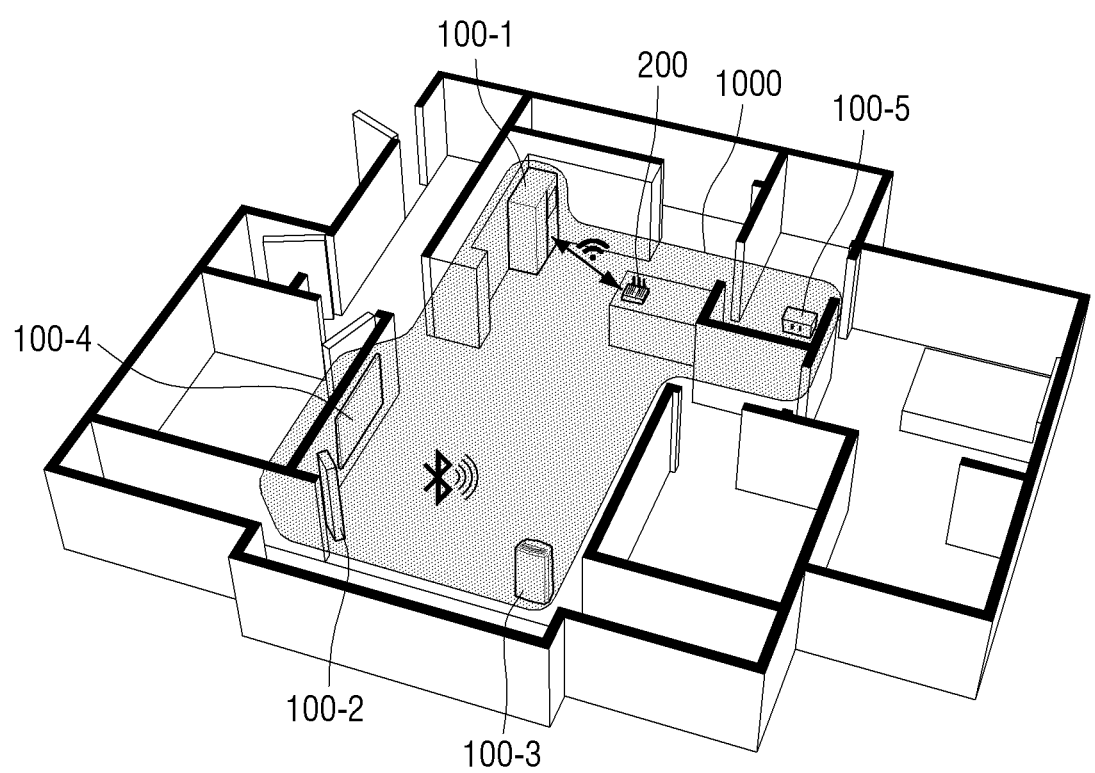
FIG. 4 is a diagram for illustrating a space wherein a remote control system in FIG. 3 is used according to an embodiment of the disclosure.

FIG. 4 is a diagram for illustrating a space wherein a remote control system in FIG. 3 is used according to an embodiment of the disclosure.

Referring to FIG. 4, the plurality of electronic apparatuses 100-1 to 100-5 and the AP apparatus 200 may be arranged in a specific space. The AP apparatus 200 may communicate with the main apparatus 100-1 by using a Wi-Fi signal.

Thereafter, the main apparatus 100-1 may communicate with the sub apparatuses 100-2 to 100-5 by using a BLE signal. As the sub apparatuses 100-2 to 100-5 communicate with another apparatus by using only a BLE signal, a communication interface function related with a Wi-Fi signal may not be used. Accordingly, the sub apparatuses 100-2 to 100-5 do not have to supply power to a communication interface related with Wi-Fi, and thus less standby power may be consumed compared to the embodiments in FIG. 1 and FIG. 2.

Figure 5:
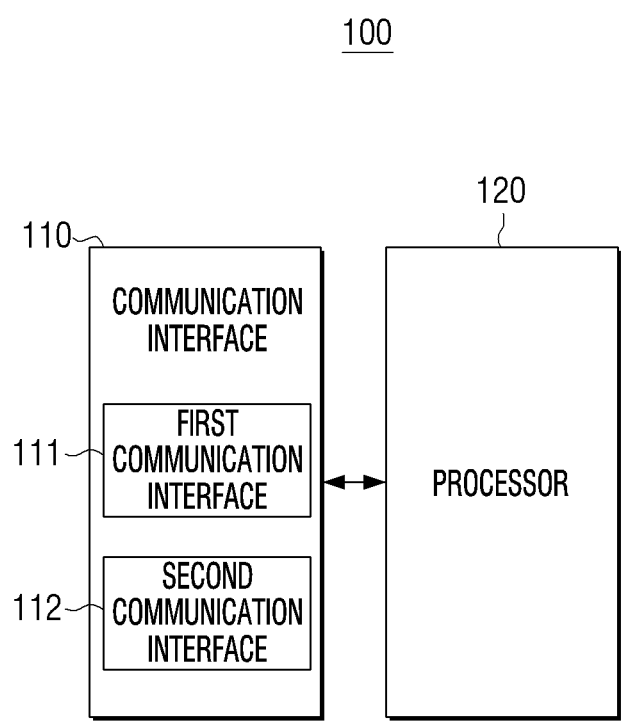
FIG. 5 is a block diagram illustrating an electronic apparatus according to an embodiment of the disclosure.

FIG. 5 is a block diagram illustrating an electronic apparatus according to an embodiment of the disclosure.

Referring to FIG. 5, the electronic apparatus 100 may include a communication interface 110 and a processor 120.

The electronic apparatus 100 according to the various embodiments of this specification may include, for example, at least one of a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a medical device, a camera, or a wearable device. A wearable device may include at least one of an accessory-type device (e.g., a watch, a ring, a bracelet, an ankle bracelet, a necklace, glasses, a contact lens, or a head-mounted-device (HMD)), a device integrated with fabrics or clothing (e.g., electronic clothing), a body-attached device (e.g., a skin pad or a tattoo), or an implantable circuit. In addition, in some embodiments of the disclosure, the electronic apparatus may include, for example, at least one of a television, a digital video disk (DVD) player, an audio, a refrigerator, an air conditioner, a cleaner, an oven, a microwave oven, a washing machine, an air cleaner, a set top box, a home automation control panel, a security control panel, a media box (e.g., Samsung HomeSync™, Apple TV™, or Google TV™), a game console (e.g., Xbox™, PlayStation™), an electronic dictionary, an electronic key, a camcorder, or an electronic photo frame.

In another embodiment of the disclosure, the electronic apparatus 100 may include at least one of various types of medical devices (e.g., various types of portable medical measurement devices (a blood glucose meter, a heart rate meter, a blood pressure meter, or a thermometer, and the like,), magnetic resonance angiography (MRA), magnetic resonance imaging (MRI), computed tomography (CT), a photographing device, or an ultrasonic instrument, and the like,), a navigation device, a global navigation satellite system (GNSS), an event data recorder (EDR), a flight data recorder (FDR), a vehicle infotainment device, an electronic device for vessels (e.g., a navigation device for vessels, a gyrocompass, and the like,), avionics, a security device, a head unit for a vehicle, an industrial or a household robot, a drone, an automatic teller machine (ATM) of a financial institution, a point of sale (POS) of a store, or an Internet of things (IoT) device (e.g., a light bulb, various types of sensors, a sprinkler device, a fire alarm, a thermostat, a street light, a toaster, exercise equipment, a hot water tank, a heater, a boiler, and the like,).

In still another embodiment of the disclosure, the electronic apparatus 100 may include at least one of a smart plug or a smart bulb, and the electronic apparatus 100 may be one of various IoT apparatuses.

The communication interface 110 is a component performing communication with various types of external apparatuses according to various types of communication methods. The communication interface 110 includes a Wi-Fi module, a Bluetooth™ module, an infrared communication module, a wireless communication module, and the like. Here, each communication module may be implemented in the form of at least one hardware chip.

The communication interface 110 may include a first communication interface 111 and a second communication interface 112.

Here, the first communication interface 111 may be a communication interface including a Bluetooth™ module. In particular, the first communication interface 111 may include a low power Bluetooth™ module, and may communicate with a plurality of electronic apparatuses by using a BLE signal.

Here, the second communication interface 112 may be a communication interface including a Wi-Fi module. In addition, the second communication interface 112 may communicate with another electronic apparatus by using Wi-Fi direct depending on embodiments.

The processor 120 may perform an overall control operation of the electronic apparatus 100. Specifically, the processor 120 performs the function of controlling the overall operations of the electronic apparatus 100.

The processor 120 may be implemented as a digital signal processor (DSP) processing digital signals, a microprocessor, and a time controller (TCON). However, the disclosure is not limited thereto, and the processor 120 may include one or more of a central processing unit (CPU), a micro controller unit (MCU), a micro processing unit (MPU), a controller, an application processor (AP), a graphics-processing unit (GPU) or a communication processor (CP), and an ARM processor, or may be defined by the terms. In addition, the processor 120 may be implemented as a system on chip (SoC) having a processing algorithm stored therein or large scale integration (LSI), or in the form of a field programmable gate array (FPGA). In addition, the processor 120 may perform various functions by executing computer executable instructions stored in a memory.

The processor 120 may control the first communication interface 111 to connect to a Bluetooth™ low energy (BLE) network, and if a Wi-Fi signal is received from the access point (AP) apparatus 200 through the second communication interface, identify the strength of the received Wi-Fi signal, transmit information on the strength of the received Wi-Fi signal to the AP apparatus 200 through the second communication interface, and if response information corresponding to the information transmitted from the AP apparatus 200 is received through the second communication interface 112, identify whether the electronic apparatus 100 is the main apparatus among the plurality of electronic apparatuses connected to the BLE network based on the received response information, and maintain Wi-Fi communication through the second communication interface 112 or release (or terminate) Wi-Fi communication based on the identification result.

The processor 120 may perform BLE communication with other electronic apparatuses including a BLE communication module by using the first communication interface 111. Thereafter, the processor 120 may perform Wi-Fi communication with the AP apparatus 200 by using the second communication interface 112. Here, the AP apparatus 200 may mean a router.

In addition, the processor 120 may receive a Wi-Fi signal transmitted from the AP apparatus 200. Thereafter, the processor 120 may acquire information on the strength of the received Wi-Fi signal. Thereafter, the processor 120 may transmit the acquired information on the strength of the Wi-Fi signal to the AP apparatus 200. Thereafter, the AP apparatus 200 may transmit the received information on the strength of the Wi-Fi signal to the server 300. From the viewpoint of the electronic apparatus 100, the information on the strength of the Wi-Fi signal was transmitted once, but the server 300 may receive the information on the strength of the Wi-Fi signal from a plurality of electronic apparatuses. The server 300 may analyze the information on the strength of the Wi-Fi signal received from the plurality of electronic apparatuses and distinguish a main apparatus and sub apparatuses. The main apparatus may mean an apparatus solely performing Wi-Fi communication with the AP apparatus 200, and the sub apparatuses may mean apparatuses that do not directly perform Wi-Fi communication with the AP apparatus 200, but perform BLE communication. The main apparatus may mean the apparatus 100-1 in FIG. 3, and the sub apparatuses may mean the apparatus 100-2 to the apparatus 100-5 in FIG. 3. The server 300 may distinguish a main apparatus and sub apparatuses for a plurality of electronic apparatuses, and generate response information including the distinguished result. Thereafter, the server 300 may transmit the generated response information to the AP apparatus 200. Thereafter, the AP apparatus 200 may transmit the response information received from the server 300 to the plurality of electronic apparatuses. Each of the plurality of electronic apparatuses may receive the response information generated at the server 300 from the AP apparatus 200.

The processor 120 may receive response information from the AP apparatus 200 through the second communication interface 112. Thereafter, the processor 120 may determine whether the electronic apparatus 100 is a main apparatus or a sub apparatus based on the response information.

Here, the response information may include information indicating that each of the plurality of electronic apparatuses that transmitted the information on the strength of the Wi-Fi signal to the AP apparatus 200 is a main apparatus or a sub apparatus, and if the electronic apparatus 100 is the main apparatus among the plurality of electronic apparatuses, the processor 120 may maintain Wi-Fi communication, and if the electronic apparatus 100 is a sub apparatus among the plurality of electronic apparatuses, the processor 120 may release Wi-Fi communication.

In case the electronic apparatus 100 is the main apparatus, the processor 120 may perform BLE communication with the sub apparatuses through the first communication interface 111, and at the same time, perform Wi-Fi communication with the AP apparatus 200 through the second communication interface 112. Accordingly, in case the electronic apparatus 100 is the main apparatus, the processor 120 may maintain Wi-Fi communication of the electronic apparatus 100. Here, maintaining Wi-Fi communication may mean maintaining the power of the Wi-Fi communication module in an on state, and keeping supplying power to the Wi-Fi communication module.

Meanwhile, in case the electronic apparatus 100 is a sub apparatus, the processor 120 may perform BLE communication with other sub apparatuses and the main apparatus through the first communication interface 111. Here, as a sub apparatus was determined as an apparatus that does not transmit and receive a Wi-Fi signal with the AP apparatus 200, the processor 120 may release Wi-Fi communication. Here, releasing Wi-Fi signal communication may mean that the power of the Wi-Fi signal communication module is turned off, and power is not supplied to the Wi-Fi communication module.

The disclosure may reduce the amount of power consumption by distinguishing a plurality of electronic apparatuses constituting the BLE network 1000 into a main apparatus and sub apparatuses and releasing Wi-Fi communication of the sub apparatuses. The power state of the communication module for each of the plurality of apparatuses will be described in FIG. 8.

Meanwhile, the main apparatus may be any one of a refrigerator, an air conditioning apparatus, an image outputting apparatus, a smart plug, or a smart bulb, and it may be determined based on at least one of information on the strength of a Wi-Fi signal or information on the standby power.

The main apparatus may be various home appliances or IoT apparatuses. Here, the main apparatus may include a BLE communication module and a Wi-Fi communication module.

Meanwhile, the standard for distinguishing a main apparatus and sub apparatuses may be at least one of information on the strength of a Wi-Fi signal and information on the standby power.

According to an embodiment of the disclosure, the server 300 may distinguish the plurality of electronic apparatuses into a main apparatus and sub apparatuses based on information on the strength of a Wi-Fi signal. The server 300 may analyze the received information on the strength of the Wi-Fi signal and identify an electronic apparatus that receives the Wi-Fi signal most strongly, determine the identified electronic apparatus as the main apparatus, and determine the electronic apparatuses other than the identified electronic apparatus as the sub apparatuses. An apparatus that receives the Wi-Fi signal most strongly has a high probability of being located (or positioned) in an adjacent location to the AP apparatus 200 in general, and thus the server 300 may determine an electronic apparatus located in an adjacent location to the AP apparatus 200 (or an apparatus that receives a Wi-Fi signal most strongly) as the main apparatus.

According to another embodiment of the disclosure, the server 300 may distinguish the plurality of electronic apparatuses into a main apparatus and sub apparatuses based on information on the standby power. The disclosure may save power by not providing power to the Wi-Fi communication modules of the sub apparatuses. However, the main apparatus may use both of a BLE communication module and a Wi-Fi communication module. Accordingly, the power consumption of the main apparatus may be smaller as the information on the standby power is lower. Thus, the server 300 may identify an electronic apparatus which has the lowest information on the standby power, determine the identified electronic apparatus as the main apparatus, and determine the electronic apparatuses other than the identified electronic apparatus as the sub apparatuses.

According to still another embodiment of the disclosure, the server 300 may distinguish the plurality of electronic apparatuses into a main apparatus and sub apparatuses based on information on the strength of a Wi-Fi signal and information on the standby power. In determining the main apparatus, the server 300 may simultaneously consider information on the strength of a Wi-Fi signal and information on the standby power. An operation related to this will be described in FIG. 7.

Meanwhile, in case the electronic apparatus 100 is the main apparatus, while Wi-Fi connection through the second communication interface 112 is maintained based on the identification result, the processor 120 may transmit a control signal received through the AP apparatus 200 to at least one of the plurality of electronic apparatuses (or the plurality of sub apparatuses) through the first communication interface 111. Here, a control signal may include a control command making the sub apparatuses operate. For example, in case a sub apparatus is an air conditioner, a control signal may include a control command instructing to lower the set temperature of the air conditioner.

In case the electronic apparatus 100 is the main apparatus, the processor 120 may perform Wi-Fi communication with the AP apparatus 200 through the second communication interface 112, and receive a control command from the AP apparatus 200 through the second communication interface 112.

If the received control command is related to the electronic apparatus 100, the processor 120 may perform an operation of the electronic apparatus 100 corresponding to the control command. However, if the received control command is not related to the electronic apparatus 100, the processor 120 may transmit the control command to the electronic apparatus which is the subject of the control command by using the first communication interface 111. For example, in case the electronic apparatus 100 is the main apparatus and the subject of a control command is not the electronic apparatus 100, the processor 120 may receive the control command from the AP apparatus 200 by using Wi-Fi communication, and transmit the control command received by using Wi-Fi communication to the electronic apparatus which is the subject of the control command.

Meanwhile, it will be assumed that the BLE network 1000 has already been constituted. The BLE network 1000 may include one main apparatus and at least one sub apparatus. The main apparatus may perform Wi-Fi communication with the AP apparatus 200, and the main apparatus and the sub apparatuses may perform BLE communication with each other. Here, it will be assumed that the electronic apparatus 100 is the main apparatus. The electronic apparatus 100 which is the main apparatus may store identification information for the plurality of apparatuses constituting the BLE network 1000.

Specifically, the electronic apparatus 100 may further include a memory 160 storing identification information for each of the plurality of electronic apparatuses, and if an external apparatus for which identification information is not stored in the memory 160 is identified in the BLE network 1000, the processor 120 may determine whether to add the identified external apparatus (or a new apparatus) to the BLE network.

If identification information for a new apparatus not stored in the memory 160 is received, the processor 120 may determine that the new apparatus is in a state of being recognized by the BLE network 1000. A recognized state does not mean a state of being included in the BLE network 1000, and thus the new apparatus may not be in a state of being connected to the BLE network 1000. The processor 120 may determine whether to add the new apparatus to the BLE network 1000.

As an example, the electronic apparatus 100 may determine whether a new apparatus can be added to the BLE network 1000 on its own not via the server 300. Here, the processor 120 may determine whether to add the new apparatus to the BLE network 1000 based on a predetermined standard stored in the memory 160 of the electronic apparatus 100. Here, a predetermined standard may be 'a list of apparatuses that can be added to the BLE network 1000' stored in the memory 160. Here, 'a list of apparatuses that can be added to the BLE network 1000' may have been received in advance from the server 300.

As another example, if a new apparatus is recognized in the BLE network 1000, the processor 120 may transmit identification information for the new apparatus to the AP apparatus 200. Thereafter, the AP apparatus 200 may transmit the transmitted identification information for the new apparatus to the server 300. Thereafter, the server 300 may compare the transmitted identification information for the new apparatus and 'a list of apparatuses that can be added to the BLE network 1000' stored in the memory of the server 300. In case the identification information for the new apparatus is included in 'a list of apparatuses that can be added to the BLE network 1000,' the server 300 may transmit information that the new apparatus is an apparatus that can be added to the BLE network 1000 to the electronic apparatus 100 which is the main apparatus by using the AP apparatus 200.

If it is determined that a new apparatus can be added to the BLE network 1000 based on 'a list of apparatuses that can be added to the BLE network 1000' stored in the electronic apparatus 100 or the server 300, the electronic apparatus 100 (the main apparatus) according to an embodiment of the disclosure may immediately add the new apparatus to the BLE network 1000.

The electronic apparatus 100 (the main apparatus) according to another embodiment of the disclosure may add a new apparatus to the BLE network 1000 limited to a case of receiving an input of a user. The first embodiment to the fourth embodiment disclosed below may be embodiments falling under a case wherein the electronic apparatus 100 is the main apparatus.

According to the first embodiment of receiving a user input, a guide user interface (UI) may be implemented to be displayed on the main apparatus based on a standard stored in the electronic apparatus 100. The electronic apparatus 100 may further include a display 130, and the processor 120 may control the display 130 to display a guide UI for adding an identified external apparatus (or a new apparatus) to the BLE network. Here, the electronic apparatus 100 may determine whether to add a new apparatus based on 'a list of apparatuses that can be added to the BLE network 1000' stored in the memory 160, and in case a new apparatus can be added to the BLE network 1000, the processor 120 may control the display 130 to display a guide UI for receiving a user input. Thereafter, if a user input is received based on the guide UI, the processor 120 may add the new apparatus to the BLE network 1000.

According to the second embodiment of receiving a user input, a guide UI may be implemented to be displayed on the main apparatus based on a standard stored in the server 300. The electronic apparatus 100 may further include a display 130, and the processor 120 may transmit information on an identified external apparatus (or a new apparatus) to the AP apparatus 200 through the second communication interface 112, and if a control signal for displaying a guide UI for adding the identified external apparatus to the BLE network is received from the AP apparatus 200, the processor 120 may control the display 130 to display the guide UI. Here, an operation of determining whether a new apparatus can be added to the BLE network 1000 may be performed at the server 300. The server 300 may determine whether to add a new apparatus based on 'a list of apparatuses that can be added to the BLE network 1000' stored in the memory of the server 300 based on the information on the external apparatus (or the new apparatus) received from the AP apparatus 200. Meanwhile, detailed explanation regarding the second embodiment will be made later in FIG. 16 and FIG. 17.

According to the third embodiment of receiving a user input, a guide UI may be displayed by using a separate user terminal apparatus. Here, a user terminal apparatus may mean a smartphone or a tablet, and detailed explanation in this regard will be made later in FIG. 18 and FIG. 19.

According to the fourth embodiment of receiving a user input, a guide UI may be implemented in a form of being displayed on a sub apparatus. Here, the fourth embodiment is similar to the first embodiment or the second embodiment of the disclosure, but it may have a difference in that a guide UI is displayed on a sub apparatus but not on the main apparatus. The processor 120 may determine whether to add a new apparatus based on 'a list of apparatuses that can be added to the BLE network 1000' stored in an internal memory or the memory of the server 300. In addition, in case a new apparatus can be added to the BLE network 1000, the processor 120 may control to display a guide UI for receiving a user input on a sub apparatus. Specifically, the processor 120 may transmit a first signal controlling to display a guide UI for adding an identified external apparatus to the BLE network to an apparatus including a display among the plurality of electronic apparatuses through the first communication interface 111, and if a second signal instructing to add the identified external apparatus to the BLE network is received from the apparatus including a display through the first communication interface 111, the processor 120 may add the external apparatus to the BLE network and transmit identification information for the external apparatus to the AP apparatus 200 through the second communication interface 112. Here, the first signal may be a signal regarding a control command to display a guide UI on a sub apparatus, and the second signal may be a signal regarding a user instruction of adding a new apparatus based on the guide UI.

Meanwhile, based on the identification result regarding whether the electronic apparatus is the main apparatus among the plurality of electronic apparatuses connected to the BLE network 1000, while Wi-Fi connection through the second communication interface 112 is maintained (it means the case wherein the electronic apparatus 100 is determined as the main apparatus), if a control signal for communicatively connecting one of the plurality of electronic apparatuses with an external apparatus not connected to the BLE network through Wi-Fi direct is received from the AP apparatus 200, the processor 120 may transmit the control signal to one of the plurality of electronic apparatuses through the first communication interface 111.

Here, one of the plurality of electronic apparatuses may be an apparatus located to be adjacent to one of external apparatuses. In addition, a control signal for communicatively connecting an electronic apparatus with an external apparatus may mean a control signal performing Wi-Fi direct communication. In addition, an external apparatus not connected to the BLE network may mean an apparatus of which Wi-Fi communication with the AP apparatus 200 is not connected smoothly, and which does not include a BLE communication module. In case an external apparatus does not include a BLE communication module, the external apparatus should perform Wi-Fi communication with the AP apparatus 200 for transmitting and receiving information with the server 300. However, in this case, if it is assumed that the external apparatus receives a Wi-Fi signal weakly from the AP apparatus 200, the external apparatus cannot transmit and receive information with the server 300 smoothly. Accordingly, the disclosure may not directly perform Wi-Fi communication between an external apparatus and the AP apparatus 200. The electronic apparatus 100 may identify an apparatus arranged in the closest location to an external apparatus (on the premise that the apparatus includes a Wi-Fi communication module) among the plurality of electronic apparatuses included in the BLE network 1000.

Meanwhile, the aforementioned embodiment is based on the assumption that an apparatus arranged in the closest location to an external apparatus is another sub apparatus which is not the electronic apparatus 100, and the embodiment explained an operation wherein the processor 120 transmits a control signal for Wi-Fi direct communicative connection between a sub apparatus arranged in the closest location to an external apparatus and the external apparatus. In addition, the embodiment will be described in FIG. 11 to FIG. 15.

However, depending on embodiments of the disclosure, in case an apparatus arranged in the closest location to an external apparatus is the electronic apparatus 100 (the main apparatus), the processor 120 may directly transmit a control signal for Wi-Fi direct communicative connection with the external apparatus.

Meanwhile, the disclosure may include a component for displaying a guide UI which is for, if a new apparatus is recognized in the BLE network 1000, making the server 300 automatically recognize the apparatus and receive a user input. Accordingly, a user can determine whether to add a new apparatus to the BLE network 1000 through a UI only by turning on the power of the new apparatus without performing a separate operation, and thus a remote control system according to the disclosure can have an effect that convenience is improved.

In addition, the disclosure may include an operation of performing Wi-Fi communication only in one main apparatus and releasing Wi-Fi communication in sub apparatuses other than the main apparatus. Accordingly, the standby power may be noticeably low compared to a case of performing Wi-Fi communication in all apparatuses.

In addition, in the disclosure, a main apparatus and sub apparatuses constitute a BLE network 1000 through BLE communication. Accordingly, BLE communication with an apparatus having weak connection with the AP apparatus 200 may be performed and the apparatus may be remote controlled without disconnection. In addition, in the past, a separate fixed hub apparatus was needed for an apparatus performing BLE communication, but in the remote control system according to the disclosure, a main apparatus can be continuously changed, and thus a fixed hub apparatus or a separate hub apparatus is not needed, and the remote control system can be constituted only with a plurality of electronic apparatuses constituting the BLE network 1000.

In addition, the disclosure discloses a component performing Wi-Fi direct communication with an electronic apparatus located in a location wherein there is no BLE communication module and a Wi-Fi signal is weak (a Wi-Fi shadow area) by using a specific apparatus included in the BLE network 1000. Accordingly, the electronic apparatus 100 according to the disclosure can have an effect of effectively remote controlling home appliances installed in various situations.

Meanwhile, so far, only simple components constituting the electronic apparatus 100 have been illustrated and described, but in actual implementation, various components may be additionally provided. Explanation in this regard will be made below with reference to FIG. 6.

Figure 6:
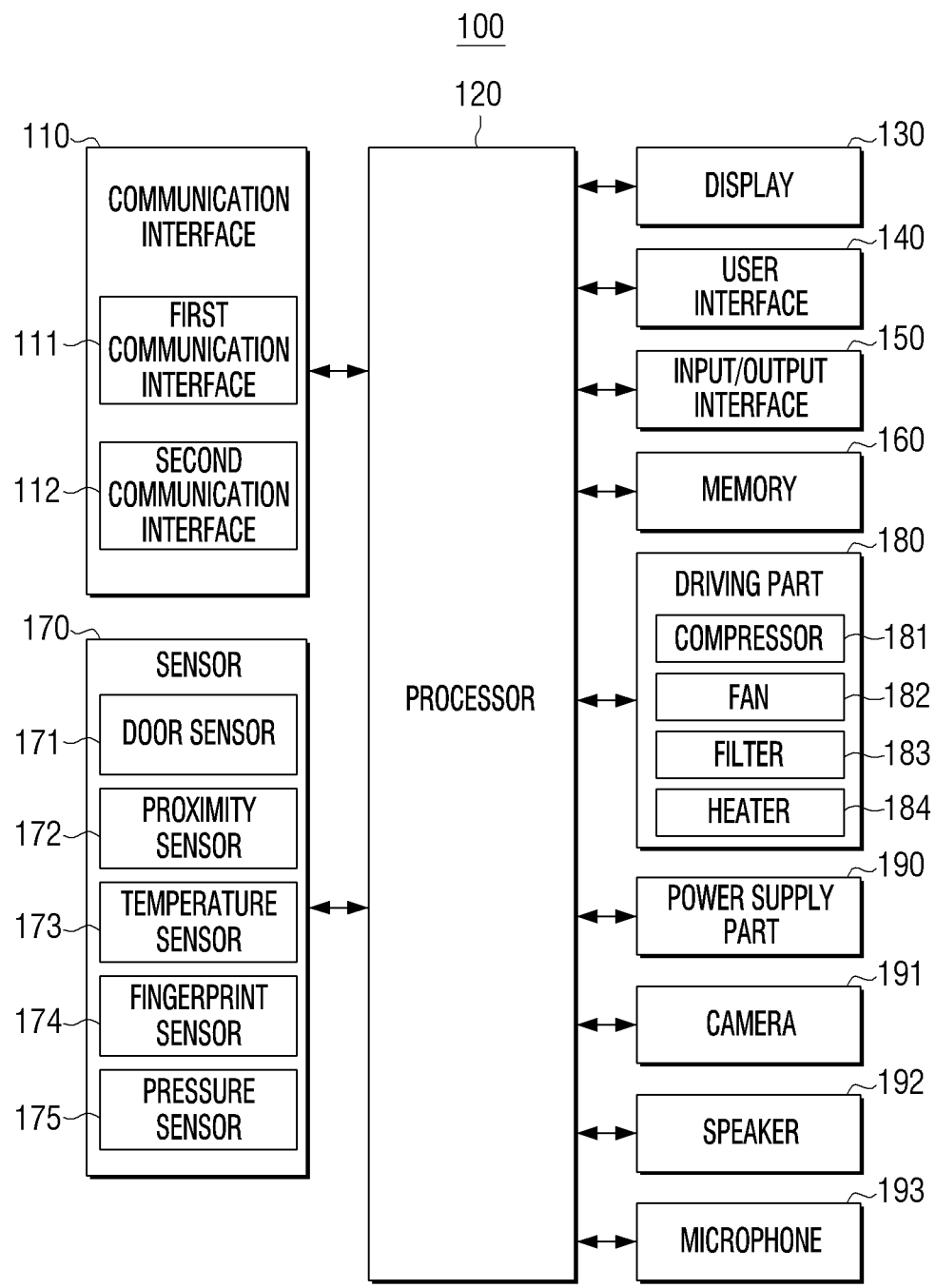
FIG. 6 is a block diagram for illustrating a configuration of an electronic apparatus in FIG. 5 according to an embodiment of the disclosure.

FIG. 6 is a block diagram for illustrating a detailed configuration of an electronic apparatus in FIG. 5 according to an embodiment of the disclosure.

Referring to FIG. 6, the electronic apparatus 100 may include at least one of a communication interface 110, a processor 120, a display 130, a user interface 140, an input/output interface 150, and a memory 160.

Meanwhile, in case the electronic apparatus 100 according to FIG. 6 is a refrigerator, the electronic apparatus 100 may further include a sensor 170, a driving part 180, a power supply part 190, a camera 191, a speaker 192, and a microphone 193. In addition, depending on embodiments of the disclosure, appropriate hardware/software components of a level obvious to a person skilled in the art may additionally be included in the refrigerator, although they are not described in the disclosure. In addition, even though a component is disclosed in the disclosure, it may be excluded from the refrigerator depending on embodiments.

Meanwhile, among the operations of the communication interface 110 and the processor 120, regarding operations that are the same as those described above, overlapping explanation will be omitted.

The processor 120 may perform communication with various kinds of external apparatuses by using the communication interface 110. Here, external apparatuses may include a display apparatus like a TV, an image processing apparatus like a set-top box, an external server, a control apparatus like a remote control, an audio outputting apparatus like a Bluetooth™ speaker, a lighting apparatus, a smart bulb, a smart plug, a smart cleaner, a home appliance like a smart refrigerator, a server like an IoT home manager, and the like.

Each of a Wi-Fi module and a Bluetooth™ module performs communication by a Wi-Fi method and a Bluetooth™ method, respectively. In the case of using a Wi-Fi module or a Bluetooth™ module, various kinds of connection information like a service set identifier (SSID) and a session key, and the like, may be transmitted and received first, and communication is connected by using them, and then various kinds of information may be transmitted and received.

An infrared communication module performs communication according to an Infrared Data Association (IrDA) communication technology of transmitting data to a near distance wirelessly by using an infrared ray located between a visible ray and a millimeter wave.

A wireless communication module may include at least one communication chip that performs communication according to various wireless communication standards, such as Zigbee™ $3^{rd}$ Generation (3G), 3rd Generation Partnership Project (3GPP), Long Term Evolution (LTE), LTE Advanced (LTE-A), 4th Generation (4G), 5th generation (5G), and the like, other than the aforementioned communication methods.

Other than the above, the communication interface 110 may include at least one of a Local Area Network (LAN) module, an Ethernet module, or a wired communication module performing communication by using a pair cable, an axial cable, or an optical fiber cable, and the like.

According to an embodiment of the disclosure, the communication interface 110 may use the same communication module (e.g., a Wi-Fi communication module) for communicating with an external apparatus like a remote control and an external server.

According to another embodiment of the disclosure, the communication interface 110 may use different communication modules (e.g., a Wi-Fi communication module) for communicating with an external apparatus like a remote control and an external server. For example, the communication interface 110 may use at least one of an Ethernet module or a Wi-Fi module for communicating with an external server, and may use a BT module for communicating with an external apparatus like a remote control. However, this is merely an example, and the communication interface 110 may use at least one communication module among various communication modules in the case of communicating with a plurality of external apparatuses or external servers.

The display 130 may be implemented as displays in various forms, such as a liquid crystal display (LCD), an organic light emitting diodes (OLED) display, a plasma display panel (PDP), and the like. Inside the display 130, driving circuits that may be implemented in forms, such as an amorphous silicon (a-si) thin film transistor (TFT), a low temperature poly silicon (LTPS) TFT, an organic TFT (OTFT), and the like, a backlight unit, and the like, may also be included. Meanwhile, the display 130 may be implemented as a touch screen combined with a touch sensor, a flexible display, a 3-dimensional (3D) display, and the like.

In addition, the display 130 according to an embodiment of the disclosure may not only include a display panel outputting images, but also a bezel housing the display panel. In particular, a bezel according to an embodiment of the disclosure may include a touch sensor (not shown) for detecting a user interaction.

The user interface 140 may be implemented as an apparatus like a button, a touch pad, a mouse, and a keyboard, or as a touch screen that can perform both of the aforementioned display function and a manipulation input function. Here, a button may be various types of buttons, such as a mechanical button, a touch pad, a wheel, and the like, formed in any areas, such as the front face part, the side surface part, the rear surface part, and the like, of the exterior of the main body of the electronic apparatus 100.

The input/output interface 150 may be the interface of any one of a high definition multimedia interface (HDMI), a mobile high-definition link (MHL), a universal serial bus (USB), a display port (DP), a Thunderbolt, a video graphics array (VGA) port, a red green blue (RGB) port, a D-sub-miniature (D-SUB), or a digital visual interface (DVI).

The input/output interface 150 may input and output at least one of an audio signal or a video signal.

Depending on implementation examples, the input/output interface 150 may include a port inputting and outputting only audio signals and a port inputting and outputting only video signals as separate ports, or it may be implemented as one port inputting and outputting both of an audio signal and a video signal.

The memory 160 may be implemented as an internal memory, such as a read-only memory (ROM) (e.g., an electrically erasable programmable read-only memory (EEPROM)), a random access memory (RAM), and the like, included in the processor 120, or as a separate memory from the processor 120. In this case, the memory 160 may be implemented in the form of a memory embedded in the electronic apparatus 100, or in the form of a memory that can be attached to or detached from the electronic apparatus 100 according to the use of stored data. For example, in the case of data for driving of the electronic apparatus 100, the data may be stored in a memory embedded in the electronic apparatus 100, and in the case of data for an extended function of the electronic apparatus 100, it may be stored in a memory that can be attached to or detached from the electronic apparatus 100.

Meanwhile, in the case of a memory embedded in the electronic apparatus 100, the memory may be implemented as at least one of a volatile memory (e.g., a dynamic RAM (DRAM), a static RAM (SRAM), or a synchronous dynamic RAM (SDRAM), and the like) or a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., NAND flash or NOR flash, and the like), a hard drive, or a solid state drive (SSD)). In the case of a memory that can be attached to or detached from the electronic apparatus 100, the memory may be implemented as a form, such as a memory card (e.g., compact flash (CF), secure digital (SD), micro secure digital (Micro-SD), mini secure digital (Mini-SD), extreme digital (xD), a multimedia card (MMC), and the like) and an external memory that can be connected to a USB port (e.g., a USB memory), and the like.

The sensor 170 may include at least one of a door sensor 171, a proximity sensor 172, a temperature sensor 173, a fingerprint sensor 174, or a pressure sensor 175.

The door sensor 171 may be a sensor that can identify opening or closing of the door attached to (included in) the electronic apparatus 100. In addition, the door sensor 171 may generate information corresponding to opening or closing of the door, and the door sensor 171 may transmit the generated sensing information to the processor 120. In addition, the door sensor 171 may detect opening or closing of the door of the refrigeration chamber or the door of the freezing chamber of the refrigerator. In addition, the door sensor 171 may be implemented as a form of generating an event in case a user opens the door and outputting data. Specifically, the door sensor 171 may identify whether a physical component was contacted so that opening or closing of the door can be identified.

The proximity sensor 172 is a sensor that detects an object without contact, and it may be used in detecting whether an object exists around the refrigerator. The proximity sensor 172 may be arranged on the front surface of at least one of the doors, and one proximity sensor or a plurality of proximity sensors may be arranged. Meanwhile, the proximity sensor 172 may be implemented as, for example, an optical proximity sensor, a capacitive proximity sensor, an inductive proximity sensor, and the like. In addition, the proximity sensor 172 may be an IR proximity sensor. The proximity sensor 172 may be located on the front surface of the door of the refrigerator. Meanwhile, access by an object may be detected not only through the proximity sensor 172 but also a front surface camera or a microphone.

The temperature sensor 173 may be used in detecting the temperature of the storage room of the refrigerator. In addition, the temperature sensor 173 may be located inside the storage room.

The fingerprint sensor 174 may be used in recognizing a user's fingerprint. The fingerprint sensor 174 may be implemented as sensors in various forms. For example, the fingerprint sensor 174 may be an optical fingerprint recognition sensor that makes a light irradiated from a light source totally reflected on a fingerprint by using a lens and a prism and generates a reflected image reflecting the difference between reflection rates that the troughs and the peaks of the fingerprint have. In addition, the fingerprint sensor 174 may be a capacitive fingerprint recognition sensor that measures the capacities of the troughs and the peaks of a fingerprint, and implements the measured electronic signal as a digital image. In addition, the fingerprint sensor 174 may be a heat sensing fingerprint recognition sensor that uses a pyroelectric substance that detects a temperature change by a heat difference between the troughs and the peaks of a fingerprint when the fingerprint contacts and generates an electronic signal.

The fingerprint sensor 174 may be arranged on at least one of the knobs of the doors. For example, the fingerprint sensor 174 may include a contact surface which is for, when a user grips a knob, recognizing the fingerprint of a finger in a driving range wherein a finger of the hand that gripped the knob can naturally contact the knob. A fingerprint image acquired through the fingerprint sensor 174 may be used in identifying a user.

The pressure sensor 175 may be arranged on a shelf of the refrigerator and used in identifying the weight of an object placed on the shelf. The pressure sensor 175 may be arranged in the form of arrays on the shelf. On the shelf of the refrigerator, a plurality of pressure sensors 175 may be arranged on intersecting points. The interval of the arrays of the pressure sensor 175 can be smaller than or equal to 1 mm. The processor 120 may identify the shape and weight of the bottom surface of food placed on the shelf based on the pressure detected at the pressure sensor 175.

Other than the above, the refrigerator may include various sensors. For example, the refrigerator may further include an illuminance sensor (not shown) detecting the amount of lights around the refrigerator for adjusting the brightness of the display 130, and the like.

The driving part 180 may include a compressor 181, a fan 182, a filter 183, or a heater 184 that operate according to control by the main processor 120. The driving part 180 may further include a lighting (not shown), or a deodorizer (not shown).

The compressor 181 may compress a refrigerant which is an operating fluid of a freezing cycle by control by the main processor 120. A freezing cycle may include a condenser (not shown) that converts a refrigerant in a gaseous state compressed by the compressor 181 into a refrigerant in a liquid state, an expander (not shown) that depressurizes the refrigerant in a liquid state, and a vaporizer (not shown) that vaporizes the depressurized refrigerant in a liquid state. The main processor 120 may control the temperature of the storage room through vaporization of the refrigerant in a liquid state. In addition, the refrigerator may control the temperature of the storage room through a peltier element (not shown) using a peltier effect, and a magnetic cooling apparatus (not shown) that uses a magnetocaloric effect.

The fan 182 may circulate the outside air by control by the main processor 120. By a cooling cycle, heated air may be heat-exchanged through the outside air and cooled.

The filter 183 may float inside the storage room, or sterilize (or, remove) the attached germs by control by the main processor 120. The filter 183 may include an ion sterilization purifying part.

The heater 184 may remove the generated frost by control by the main processor 120. The heater 184 may include a defrost heater.

The power supply part 190 may supply power to the components of the refrigerator by control by the processor 120. The power supply part 190 may supply power input from an external power source to each component of the refrigerator through a power code (not shown) by control by the processor 120.

The camera 191 is a component for photographing an object and generating a photographed image, and here, a photographed image is a concept including both of a moving image and a still image.

The camera 191 may acquire an image for at least one external apparatus, and it may be implemented as a camera, a lens, an infrared sensor, and the like.

The camera 191 may include a lens and an image sensor. As the types of the lens, there are a general generic-purpose lens, a wide angle lens, a zoom lens, and the like, and the type of the lens may be determined according to the type, the characteristic, the usage environment, and the like, of the electronic apparatus 100. As the image sensor, a complementary metal oxide semiconductor (CMOS) and a charge coupled device (CCD), and the like, may be used.

The camera 191 may include a front surface camera and an internal camera. In addition, the camera may photograph a still image or a moving image.

The front surface camera may be arranged to photograph the front surface of the refrigerator. The processor 120 may identify a user based on the user face included in an image that photographed the user through the front surface camera. The internal camera may be arranged to photograph at least one of the storage rooms. The internal camera may be arranged in any location if it is a location that can photograph the inside of a storage room while the door is closed. Meanwhile, the processor 120 may store an image photographed through one of the front surface camera or the internal camera in the memory 160.

The speaker 192 may be a component outputting not only various kinds of audio data processed at the input/output interface 150 but also various kinds of notification sounds or voice messages, and the like.

The microphone 193 may be a component for receiving input of a user voice or other sounds and converting them into audio data.

The microphone 193 may receive a user voice in an activated state. For example, the microphone may be formed as an integrated type on the upper side or the front surface direction, the side surface direction, and the like, of the electronic apparatus 100. The microphone may include various components, such as a microphone collecting user voices in an analog form, an amp circuit that amplifies collected user voices, an analogue-digital (A/D) conversion circuit that samples amplified user voices and converts them into a digital signal, a filter circuit that removes a noise component from a converted digital signal, and the like.

Figure 7:
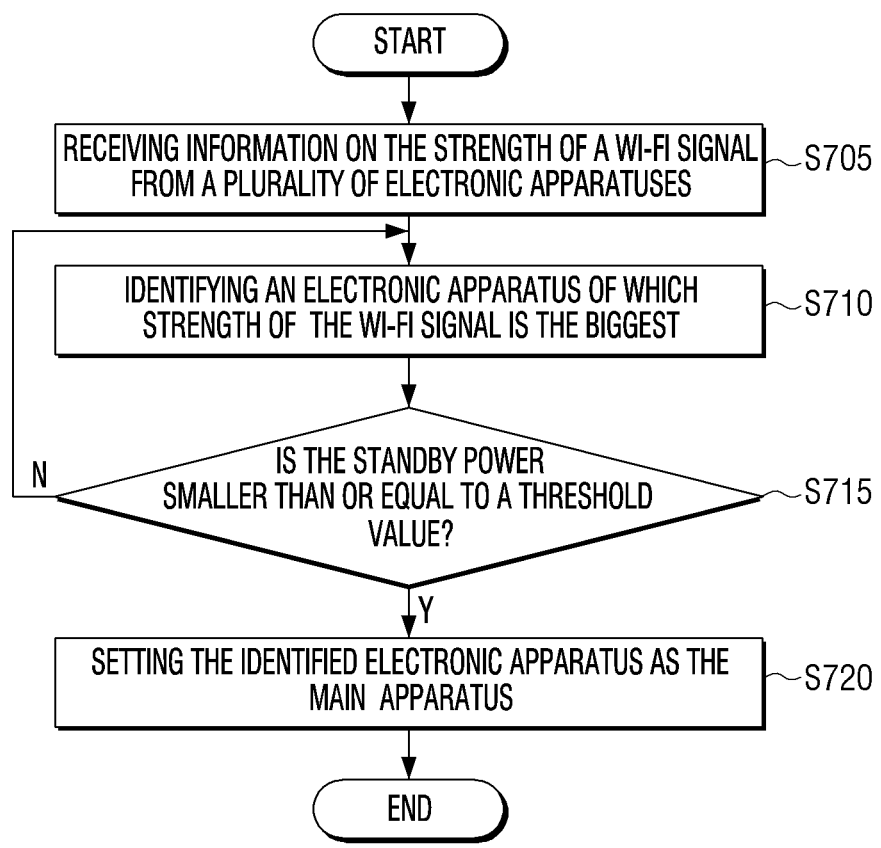
FIG. 7 is a flowchart for illustrating an operation of identifying a main apparatus among a plurality of electronic apparatuses according to an embodiment of the disclosure.

FIG. 7 is a flowchart for illustrating an operation of a server identifying a main apparatus among a plurality of electronic apparatuses according to an embodiment of the disclosure.

Referring to FIG. 7, the server 300 may receive strength information for a Wi-Fi signal from the plurality of electronic apparatuses 100-1 to 100-5 by using the AP apparatus 200 at operation S705. In addition, the server 300 may control the AP apparatus 200 to transmit a Wi-Fi signal to the plurality of electronic apparatuses 100-1 to 100-5 located near the AP apparatus 200. Thereafter, the server 300 may receive strength information of a Wi-Fi signal of each of the plurality of electronic apparatuses 100-1 to 100-5 by using the AP apparatus 200. Specifically, the plurality of electronic apparatuses 100-1 to 100-5 may acquire the strength information for a Wi-Fi signal transmitted from the AP apparatus 200, and transmit the acquired strength information to the AP apparatus 200. The AP apparatus 200 may receive the strength information for a Wi-Fi signal transmitted from the plurality of electronic apparatuses 100-1 to 100-5, and transmit the received strength information for a Wi-Fi signal to the server 300.

In addition, the server 300 may identify an electronic apparatus of which strength of the Wi-Fi signal is the biggest among the plurality of electronic apparatuses at operation S710. In general, the AP apparatus 200 is transmitting a Wi-Fi signal, and thus the strength of the Wi-Fi signal of an electronic apparatus close to the AP apparatus 200 may be big, and the strength of the Wi-Fi signal of an electronic apparatus far from the AP apparatus 200 may be small.

In addition, the server 300 may determine whether the standby power of the electronic apparatus of which strength of the Wi-Fi signal is the biggest is smaller than or equal to a threshold value at operation S715. The standby power may mean power that is consumed in a state of waiting such that a specific signal can be received even though a main function is not performed in a state of being connected with an external power source. In addition, the standby power may mean power that is consumed while the power of the electronic apparatus is turned off.

In case the standby power of the electronic apparatus identified at the operation S710 is greater than or equal to the threshold value, the server 300 may identify an electronic apparatus of which strength of the Wi-Fi signal is the biggest among the apparatuses other than the identified electronic apparatus. Meanwhile, in case the standby power exceeds the threshold value, the server 300 may determine that power consumption is high, and thus the identified electronic apparatus is not appropriate for the main apparatus.

In case the standby power of the electronic apparatus identified at the operation S710 is smaller than or equal to the threshold value, the server 300 may identify the identified electronic apparatus as the main apparatus at operation S720. The main apparatus may mean one apparatus that communicates with the AP apparatus 200 through a Wi-Fi signal. In case the standby power is smaller than or equal to the threshold value, the server 300 may determine that power consumption is low, and thus the identified electronic apparatus is appropriate for the main apparatus.

Meanwhile, as an example, information related to the standby power may have been stored in advance in the memory of the server 300. Accordingly, the server 300 may compare the identification information of the electronic apparatus identified at the operation S710 and the information on the standby power of each electronic apparatus stored in the memory, and thereby acquire information on the standby power of the electronic apparatus identified at the operation S710.

Meanwhile, as another example, information related to the standby power may be directly acquired from the AP apparatus 200. The server 300 may request information on the standby power consumed at the plurality of electronic apparatuses 100-1 to 100-5 during a specific time period by using the AP apparatus 200. Thereafter, the plurality of electronic apparatuses 100-1 to 100-5 may transmit the information on the consumed standby power to the server 300 by using the AP apparatus 200. The server 300 may receive the standby power information corresponding to the plurality of electronic apparatuses 100-1 to 100-5 through the AP apparatus 200.

Figure 8:
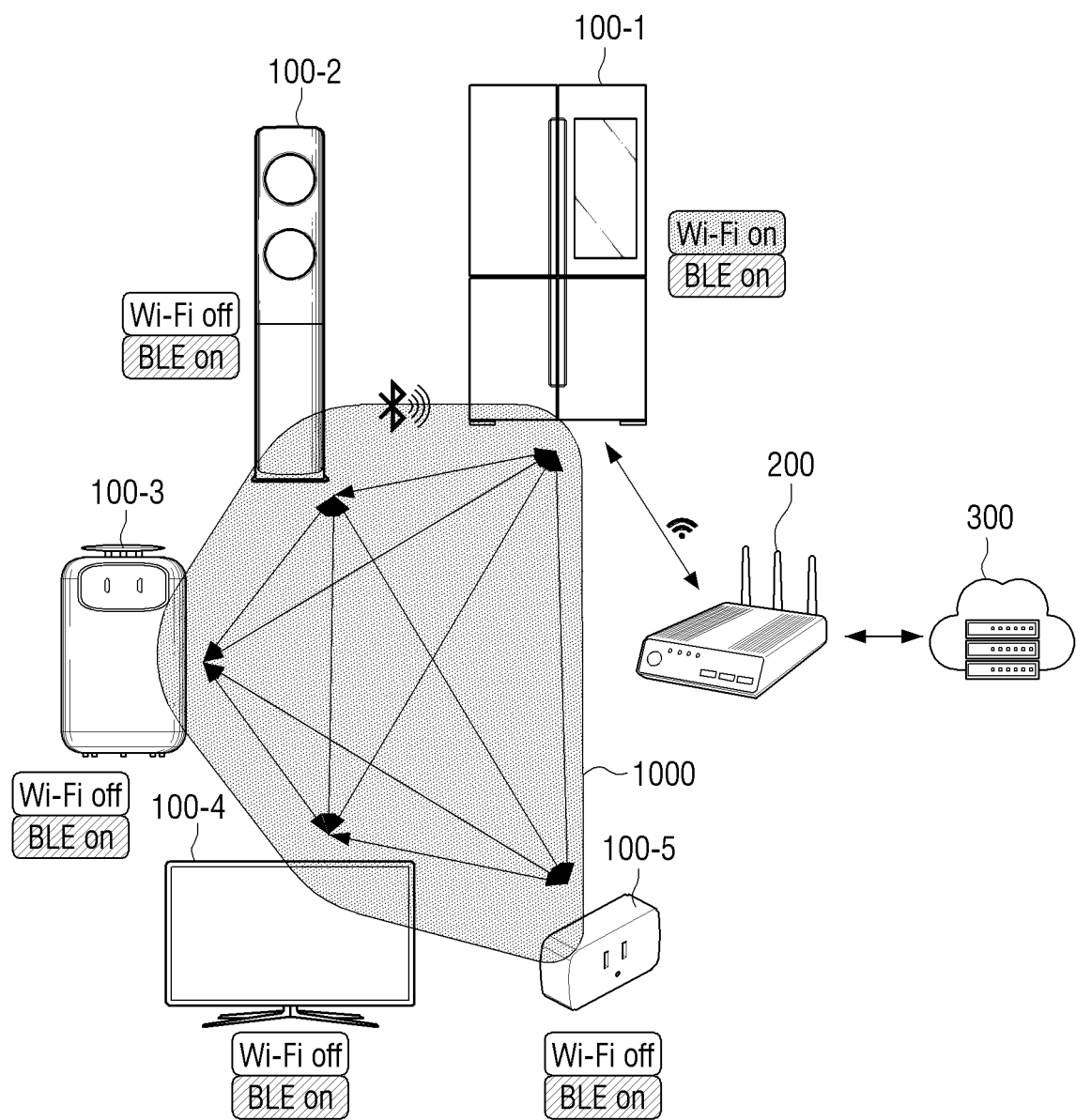
FIG. 8 is a diagram for illustrating turning-on/turning-off of a Wi-Fi and BLE communication functions of a plurality of electronic apparatuses according to an embodiment of the disclosure.

FIG. 8 is a diagram for illustrating turning-on/turning-off of a Wi-Fi and BLE communication functions of a plurality of electronic apparatuses according to an embodiment of the disclosure.

Referring to FIG. 8, it will be assumed that the main apparatus is the apparatus 100-1, and the sub apparatuses are the apparatuses 100-2 to 100-5.

As the plurality of electronic apparatuses 100-1 to 100-5 constitute the BLE network 1000, all of the plurality of electronic apparatuses 100-1 to 100-5 may supply power to a communication interface that can transmit and receive a BLE signal even though their powers are turned off. For example, all of the plurality of electronic apparatuses 100-1 to 100-5 may always maintain the BLE function in an on state even in a state that the power is turned off.

Here, as the sub apparatuses 100-2 to 100-5 among the plurality of electronic apparatuses 100-1 to 100-5 do not transmit and receive a Wi-Fi signal, the sub apparatuses may not provide power to a communication interface that can transmit and receive a Wi-Fi signal. For example, the sub apparatuses 100-2 to 100-5 may always maintain the Wi-Fi function in an off state in a state that the power is turned off.

Meanwhile, the main apparatus 100-1 should be able to transmit and receive a Wi-Fi signal with the AP apparatus 200 at the same time as constituting the BLE network 1000. Accordingly, the main apparatus 100-1 may supply power to a communication interface that can transmit and receive a Wi-Fi signal and a BLE signal even if the power is turned off. For example, the main apparatus 100-1 may always maintain the Wi-Fi function and the BLE function in an on state even in a state that the power is turned off.

As the main apparatus 100-1 always maintains the Wi-Fi function in an on state compared to the sub apparatuses 100-2 to 100-5, its power consumption may be bigger compared to the sub apparatuses 100-2 to 100-5. However, referring to the overall remote control system in FIG. 8, as the sub apparatuses 100-2 to 100-5 always maintain the Wi-Fi function in an off state, power consumption may be much smaller than in the embodiments of FIG. 1 and FIG. 2.

Figure 9:
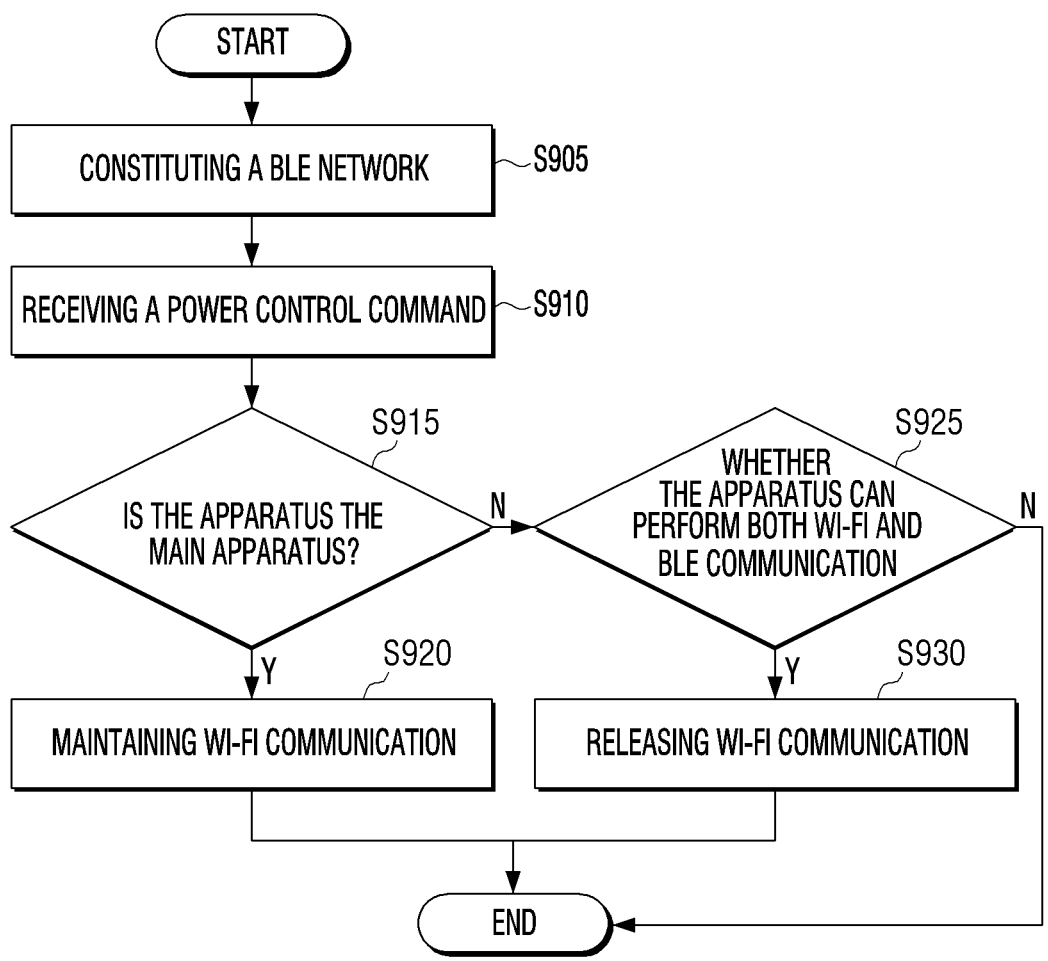
FIG. 9 is a flowchart for illustrating an operation determined in a plurality of electronic apparatuses in FIG. 8 according to an embodiment of the disclosure.

FIG. 9 is a flowchart for illustrating an operation determined in a plurality of electronic apparatuses in FIG. 8 according to an embodiment of the disclosure.

Referring to FIG. 9, one apparatus (described as the electronic apparatus 100 for convenience) among the plurality of electronic apparatuses may constitute the BLE network 1000 at operation S905. The electronic apparatus 100 may transmit and receive a BLE signal with other adjacent electronic apparatuses by using the BLE network 1000.

The electronic apparatus 100 may receive a power control command generated at the server 300 at operation S910. In case the electronic apparatus 100 is the main apparatus 100-1, a power control command may be received from the AP apparatus 200. In addition, in case the electronic apparatus 100 is the sub apparatus 100-2 to 100-5, a power control command may be received from the main apparatus 100-1 through the BLE network 1000. A power control command may be a control command for maintaining Wi-Fi communication in case the electronic apparatus 100 is the main apparatus 100-1 and releasing Wi-Fi communication in case the electronic apparatus 100 is the sub apparatus 100-2 to 100-5.

The electronic apparatus 100 may determine whether the electronic apparatus 100 itself is the main apparatus based on information included in a power control command at operation S915. Here, if the electronic apparatus 100 is the main apparatus, the electronic apparatus 100 may maintain the Wi-Fi function in an on state for maintaining Wi-Fi communication at operation S920. In addition, if the electronic apparatus 100 is the main apparatus 100-1, the Wi-Fi function may have already been in an on state, and thus the operation may be an operation of maintaining the previous on state.

If the electronic apparatus 100 is not the main apparatus, the electronic apparatus 100 may determine whether both of Wi-Fi communication and BLE communication can be performed at operation S925. The operation S925 may be replaced by an operation of determining whether the electronic apparatus 100 can perform Wi-Fi communication depending on embodiments.

In case it is determined that the electronic apparatus 100 can perform both of Wi-Fi communication and BLE communication, the electronic apparatus 100 may release Wi-Fi communication at operation S930. The electronic apparatus 100 may change the Wi-Fi function to an off state (in case the previous state was an on state) or maintain the off state (in case the previous state was an off state) for releasing Wi-Fi communication.

Meanwhile, in case it is determined that the electronic apparatus 100 cannot perform both of Wi-Fi communication and BLE communication, the electronic apparatus 100 may not perform a separate operation. As the electronic apparatus 100 has already constituted the BLE network 1000, even if the electronic apparatus 100 cannot perform Wi-Fi communication, it may have to maintain BLE communication.

Figure 10:
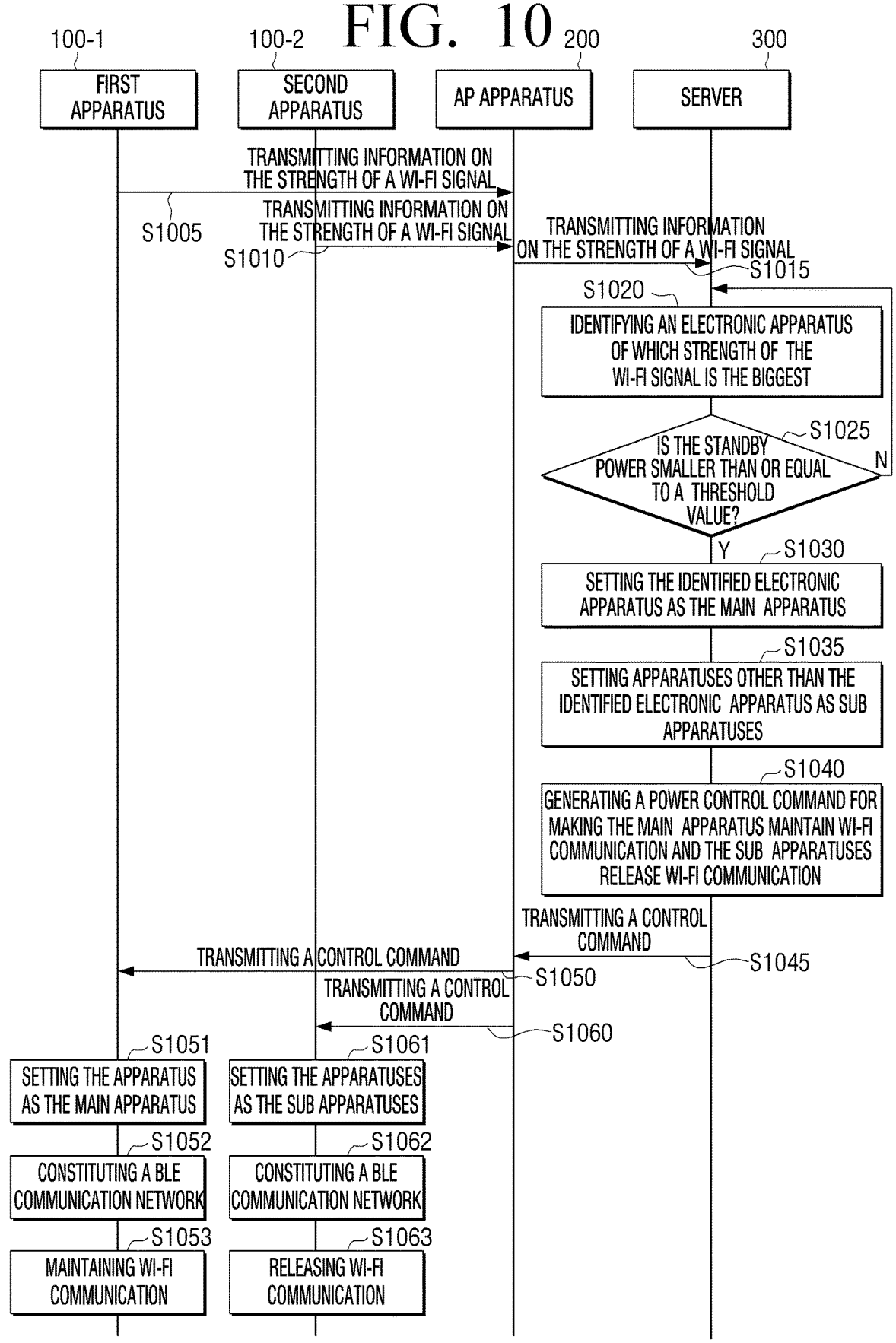
FIG. 10 is a sequence diagram for illustrating an operation performed in FIG. 8 according to an embodiment of the disclosure.

FIG. 10 is a sequence diagram for illustrating an operation performed in FIG. 8 according to an embodiment of the disclosure.

Referring to FIG. 10, a remote control system may include a first apparatus 100-1, a second apparatus 100-2, an AP apparatus 200, and a server 300. In addition, it will be assumed that the first apparatus 100-1 and the second apparatus 100-2 received a Wi-Fi signal from the AP apparatus 200.

The first apparatus 100-1 may analyze the received Wi-Fi signal and transmit strength information for the Wi-Fi signal to the AP apparatus 200 at operation S1005. Thereafter, the second apparatus 100-2 may analyze the received Wi-Fi signal and transmit strength information for the Wi-Fi signal to the AP apparatus 200 at operation S1010.

The AP apparatus 200 may transmit the strength information for the Wi-Fi signals received from the first apparatus 100-1 and the second apparatus 100-2 to the server 300 at operation S1015. Thereafter, the server 300 may receive the strength information for the Wi-Fi signals corresponding to the first apparatus 100-1 and the second apparatus 100-2 received from the AP apparatus 200.

In addition, the server 300 may identify the electronic apparatus of which strength of the Wi-Fi signal is the biggest based on the received strength information for the Wi-Fi signals at operation S1020. In addition, the server 300 may determine whether the standby power of the identified electronic apparatus is smaller than or equal to a threshold value at operation S1025. If the standby power of the identified electronic apparatus exceeds the threshold value, the server 300 may identify the electronic apparatus of which strength of the Wi-Fi signal is the biggest among the electronic apparatuses other than the identified electronic apparatus.

If the standby power of the identified electronic apparatus is smaller than or equal to the threshold value, the server 300 may set the identified electronic apparatus as the main apparatus at operation S1030. In addition, the server 300 may set apparatuses other than the set electronic apparatus as sub apparatuses at operation S1035. Here, it will be assumed that the main apparatus is the first apparatus 100-1 and the sub apparatus is the second apparatus 100-2.

In addition, the server 300 may generate a power control command that the main apparatus should maintain Wi-Fi communication and the sub apparatus should release Wi-Fi communication at operation S1040. Thereafter, the server 300 may transmit the generated power control command to the AP apparatus 200 at operation S1045.

In addition, the AP apparatus 200 may transmit the power control command received from the server 300 to the first apparatus 100-1 at operation S1050. As it was assumed that the first apparatus 100-1 is the main apparatus, the first apparatus 100-1 may be set as the main apparatus at operation S1051. Thereafter, the first apparatus 100-1 may constitute the BLE network 1000 with other electronic apparatuses at operation S1052. Thereafter, the first apparatus 100-1 may maintain Wi-Fi communication at operation S1053.

Meanwhile, the AP apparatus 200 may transmit the power control command received from the server 300 to the second apparatus 100-2 at operation S1061. As it was assumed that the second apparatus 100-2 is the sub apparatus, the second apparatus 100-2 may be set as the sub apparatus at operation S1061. Thereafter, the second apparatus 100-2 may constitute the BLE network 1000 with other electronic apparatuses at operation S1062. Thereafter, the second apparatus 100-2 may release Wi-Fi communication at operation S1063.

Figure 11:
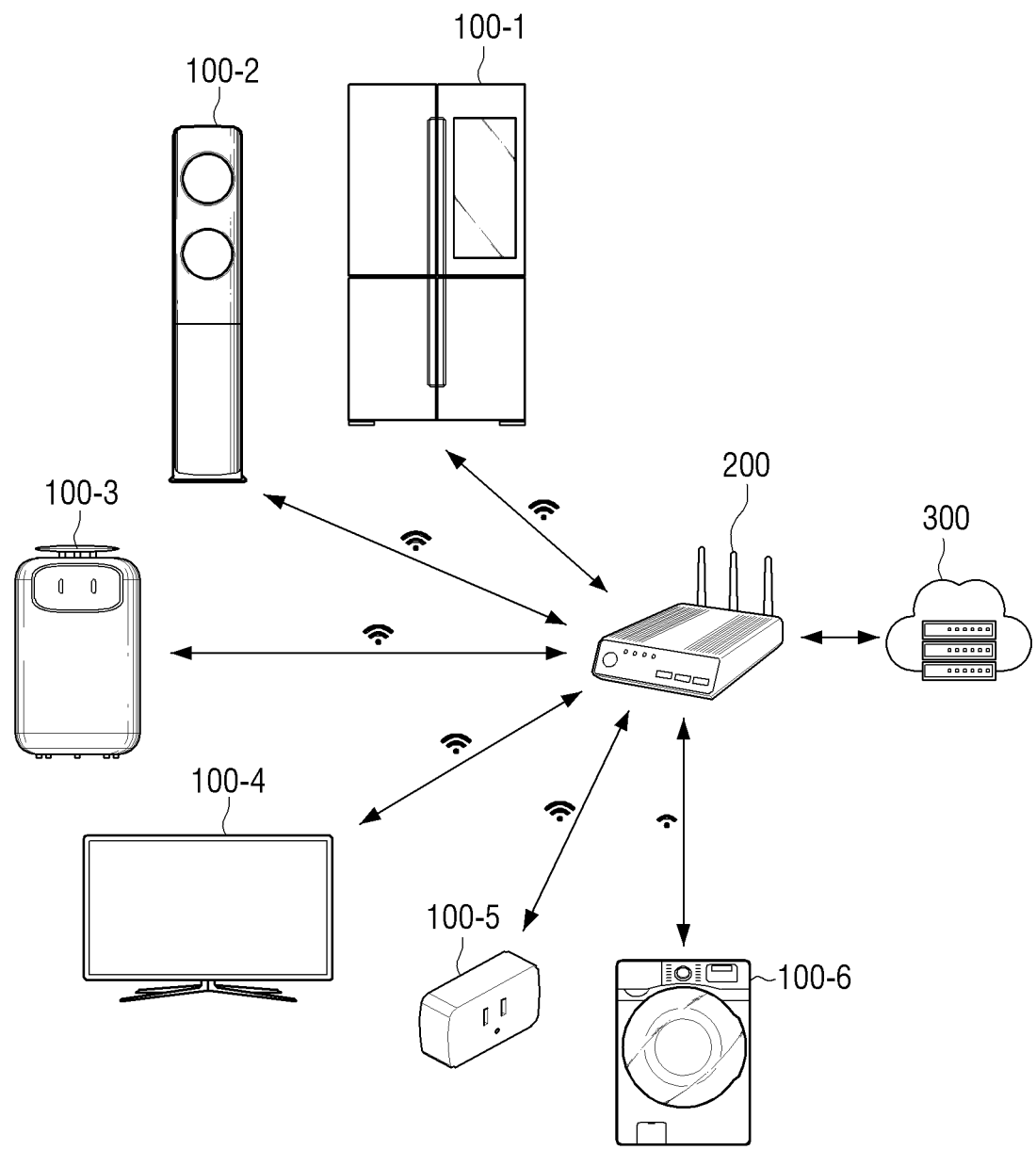
FIG. 11 is a diagram for illustrating an embodiment wherein an electronic apparatus having a weak Wi-Fi signal is identified according to an embodiment of the disclosure.

FIG. 11 is a diagram for illustrating an embodiment wherein an electronic apparatus having a weak Wi-Fi signal is identified according to an embodiment of the disclosure.

Referring to FIG. 11, a remote control system may include apparatuses wherein Wi-Fi signals are received strongly 100-1 to 100-5, an apparatus wherein a Wi-Fi signal is received weakly 100-6, an AP apparatus 200, and a server 300.

The embodiment in FIG. 11 is an embodiment which is similar to FIG. 1, and to which an apparatus wherein a Wi-Fi signal is received weakly 100-6 has been added. Here, a case wherein the apparatus wherein a Wi-Fi signal is received weakly 100-6 cannot perform BLE communication is assumed. Even in the case of the apparatus wherein a Wi-Fi signal is received weakly 100-6, if the apparatus can perform BLE communication, a control command may be received by using the BLE network 1000. However, if a BLE communication module does not exist in the apparatus wherein a Wi-Fi signal is received weakly 100-6, the apparatus wherein a Wi-Fi signal is received weakly 100-6 may receive a control command only by using a Wi-Fi communication module.

Here, if the plurality of electronic apparatuses are remote controlled only by using a Wi-Fi signal, a problem may occur in control of the apparatus wherein a Wi-Fi signal is received weakly 100-6. As reasons that a Wi-Fi signal is received weakly, there may be a structural problem and a functional problem of the electronic apparatus itself. A structural problem may mean that in the arrangement location of the electronic apparatus, a Wi-Fi signal cannot be received normally. A functional problem of the electronic apparatus itself may mean that the Wi-Fi communication module of the electronic apparatus broke down.

In case a Wi-Fi signal is not transmitted normally with the apparatus wherein a Wi-Fi signal is received weakly 100-6, a problem that a user cannot control the apparatus wherein a Wi-Fi signal is received weakly 100-6 may occur.

Figure 12:
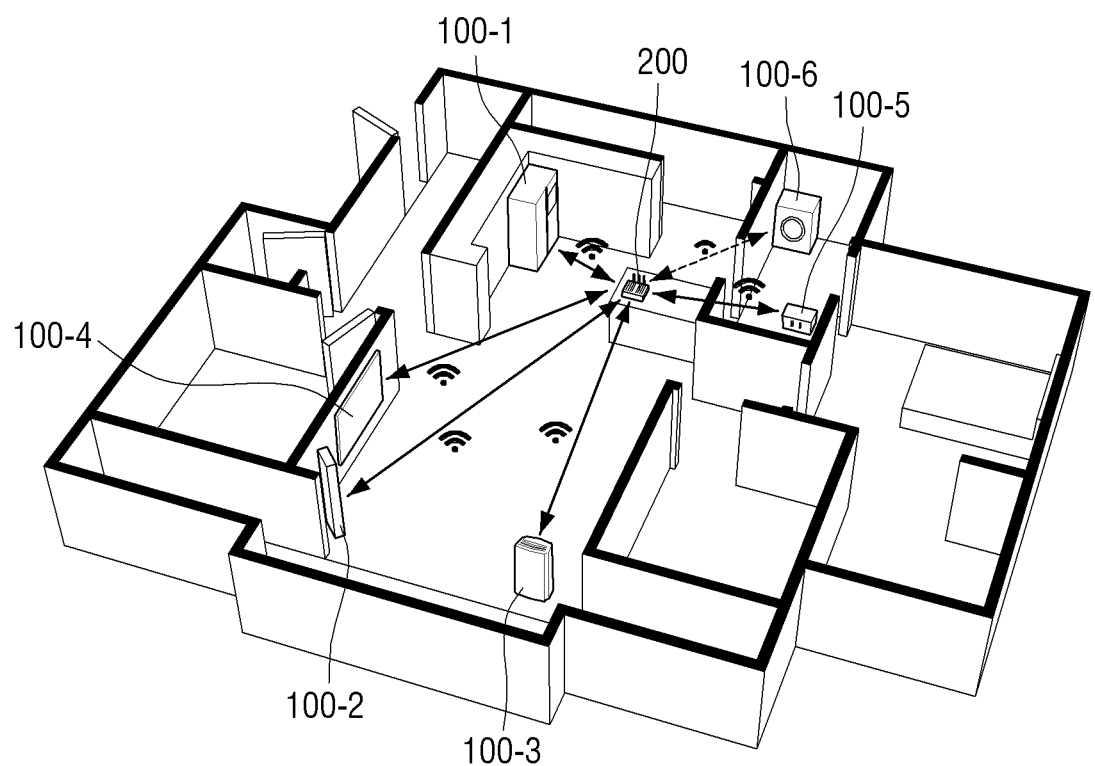
FIG. 12 is a diagram for illustrating a space wherein a remote control system in FIG. 11 is used according to an embodiment of the disclosure.

FIG. 12 is a diagram for illustrating a space wherein a remote control system in FIG. 11 is used according to an embodiment of the disclosure.

Referring to FIG. 12, in a specific space, the apparatuses wherein Wi-Fi signals are received strongly 100-1 to 100-5, the apparatus wherein a Wi-Fi signal is received weakly 100-6, and the AP apparatus 200 may be arranged.

The AP apparatus 200 can transmit and receive Wi-Fi signals normally with the apparatuses wherein Wi-Fi signals are received strongly 100-1 to 100-5. This may be because no specific structural obstacle exists. However, the AP apparatus 200 cannot transmit and receive Wi-Fi signals normally with the apparatus wherein a Wi-Fi signal is received weakly 100-6. This may be because a wall (a structural obstacle) exists between the AP apparatus 200 and the apparatus wherein a Wi-Fi signal is received weakly 100-6. Accordingly, in general, in the case of the apparatus wherein a Wi-Fi signal is received weakly 100-6 having a structural obstacle around it, there may be a difficulty for a user to perform remote control by using a Wi-Fi signal.

Figure 13:
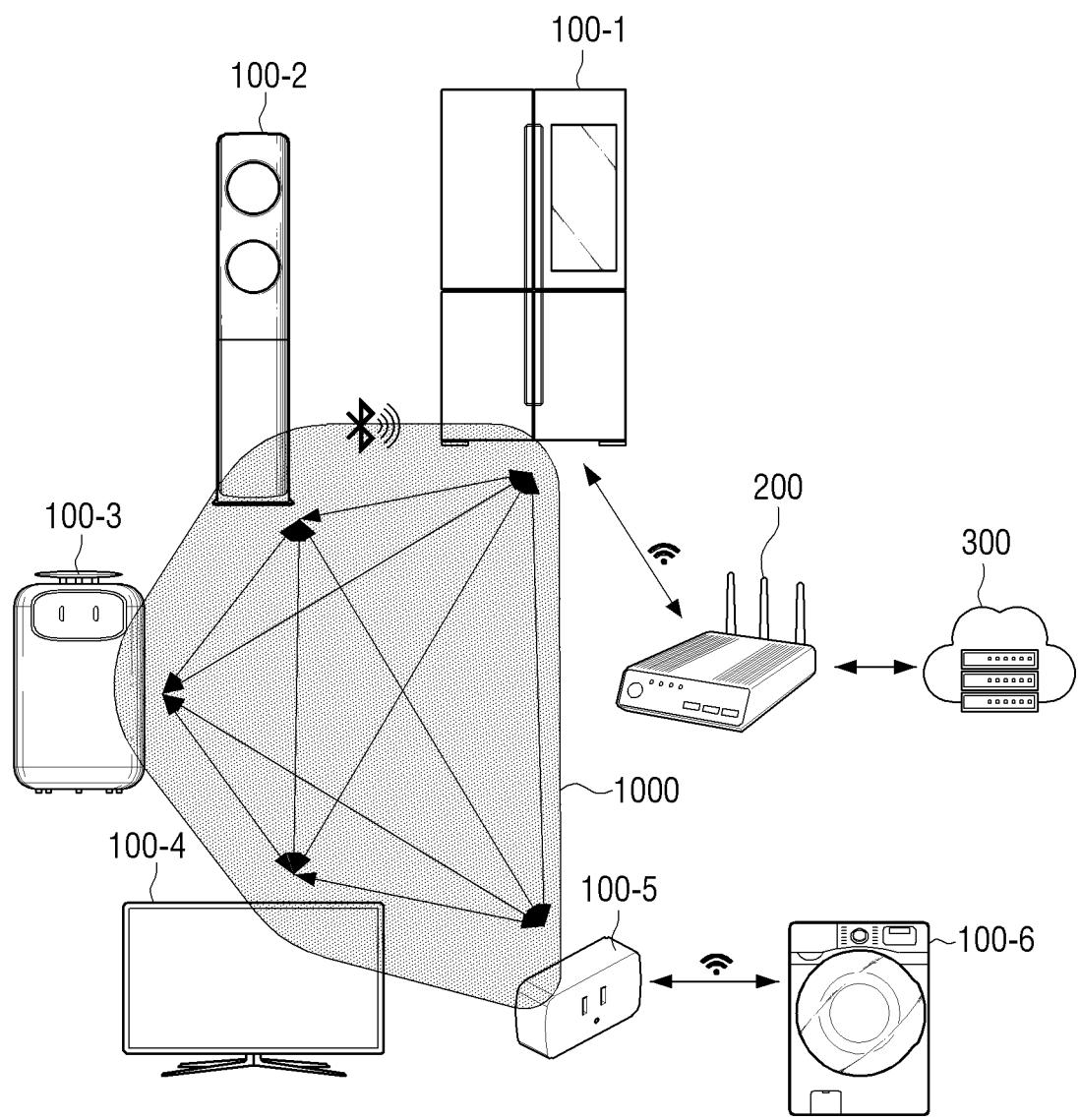
FIG. 13 is a diagram for illustrating an embodiment wherein an electronic apparatus having a weak Wi-Fi signal is connected with a server by using a separate communication technology according to an embodiment of the disclosure.

FIG. 13 is a diagram for illustrating an embodiment wherein an electronic apparatus having a weak Wi-Fi signal is connected with a server by using a separate communication technology according to an embodiment of the disclosure.

Referring to FIG. 13, the server 300 may use the BLE network 1000 for addressing the issues that occur in FIG. 11 and FIG. 12. Specifically, the server 300 may identify an electronic apparatus 100-5 adjacent to the apparatus wherein a Wi-Fi signal is received weakly 100-6, and perform control such that the identified electronic apparatus 100-5 and the apparatus wherein a Wi-Fi signal is received weakly 100-6 communicate by using a Wi-Fi direct technology.

Figure 14:
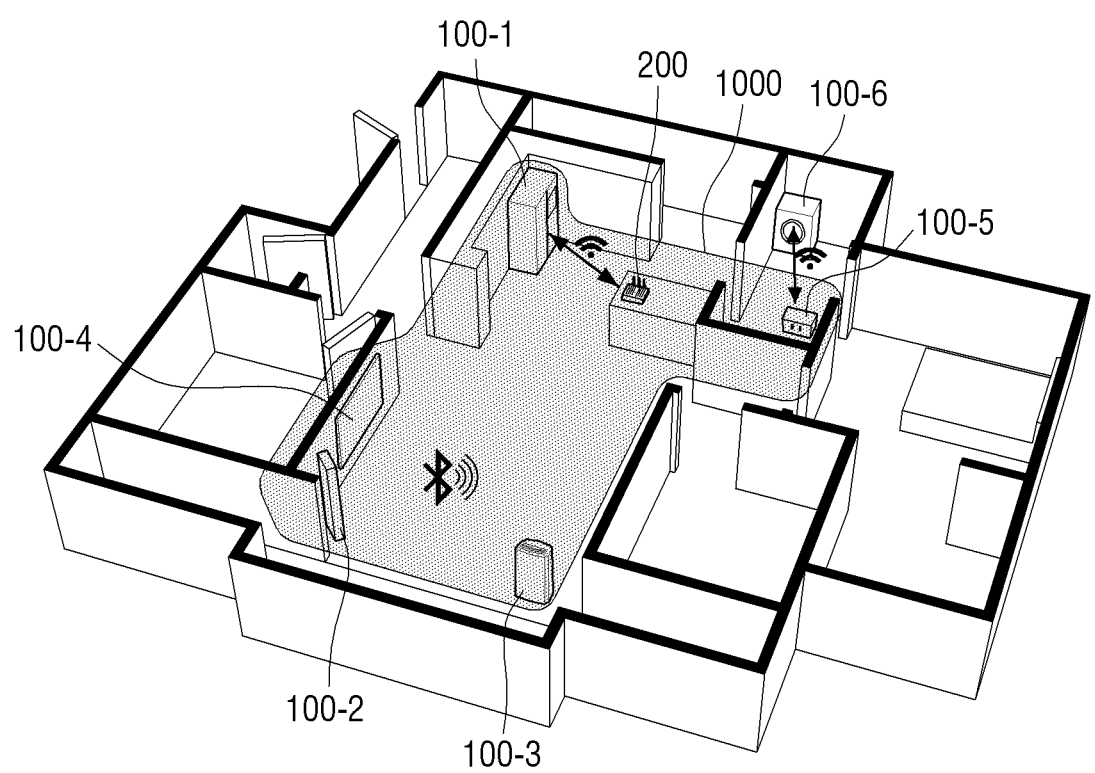
FIG. 14 is a diagram for illustrating a space wherein a remote control system in FIG. 13 is used according to an embodiment of the disclosure.

FIG. 14 is a diagram for illustrating a space wherein a remote control system in FIG. 13 is used according to an embodiment of the disclosure.

Referring to FIG. 14, in a specific space, the apparatuses wherein Wi-Fi signals are received strongly 100-1 to 100-5, the apparatus wherein a Wi-Fi signal is received weakly 100-6, and the AP apparatus 200 may be arranged. Like in the embodiment in FIG. 13, an apparatus 100-5 which is closest to the apparatus wherein a Wi-Fi signal is received weakly 100-6 may be identified. Thereafter, the identified apparatus 100-5 may communicate with the apparatus wherein a Wi-Fi signal is received weakly 100-6 by using a Wi-Fi direct technology.

Although a structural obstacle exists between the AP apparatus 200 and the apparatus wherein a Wi-Fi signal is received weakly 100-6, the apparatus wherein a Wi-Fi signal is received weakly 100-6 may receive a control command by using the BLE network 1000 and a Wi-Fi direct technology.

Figure 15:
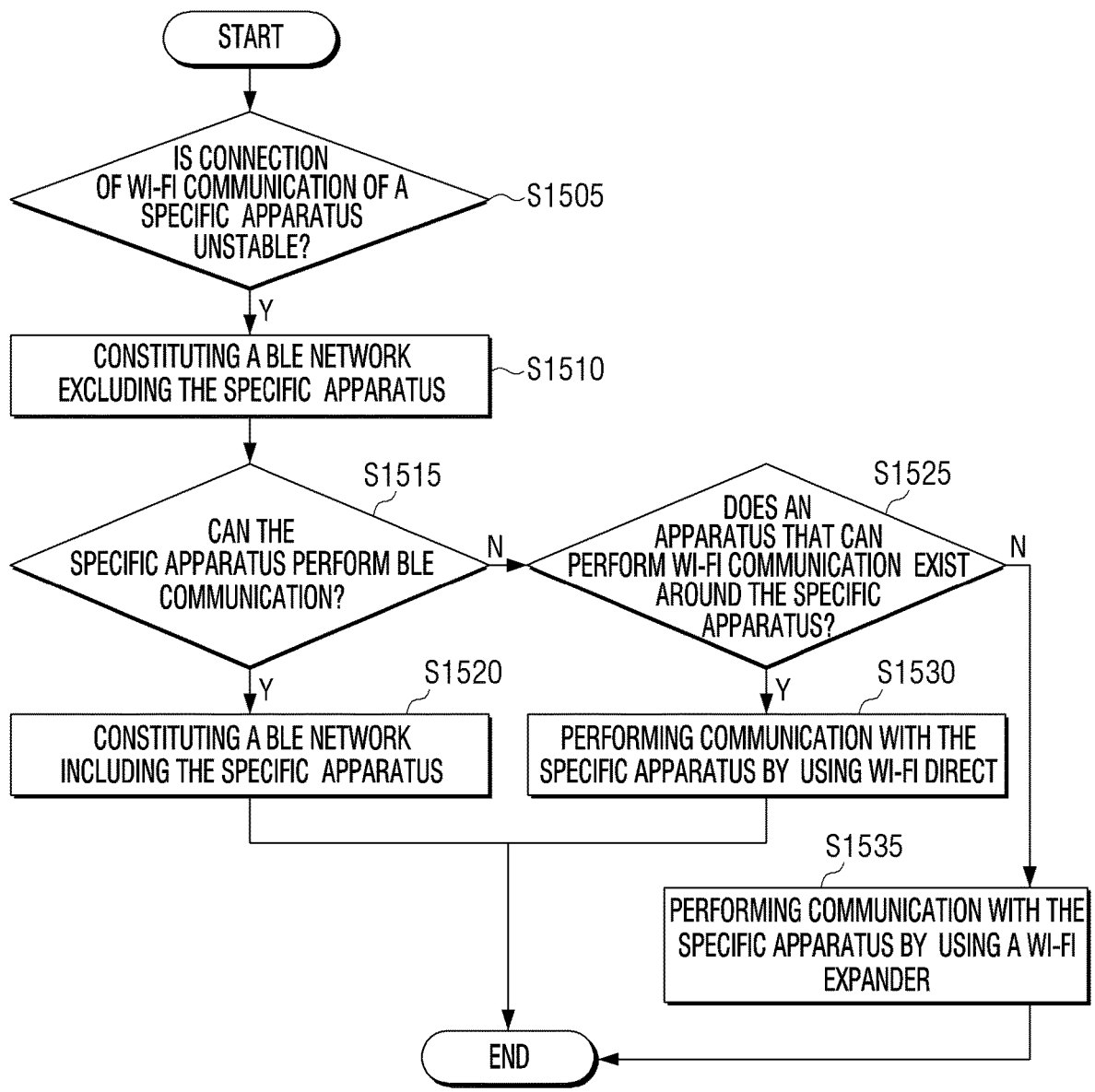
FIG. 15 is a flowchart for illustrating an operation performed in a remote control system in FIG. 13 according to an embodiment of the disclosure.

FIG. 15 is a flowchart for illustrating an operation performed in a remote control system in FIG. 13 according to an embodiment of the disclosure.

Referring to FIG. 15, the server 300 may receive strength information for Wi-Fi signals corresponding to the plurality of electronic apparatuses 100-1 to 100-6 from the AP apparatus 200. Thereafter, the server 300 may identify the apparatus wherein a Wi-Fi signal is received weakly 100-6 among the plurality of electronic apparatuses at operation S1505. Thereafter, the server 300 may perform control such that the BLE network 1000 is constituted only with the apparatuses wherein Wi-Fi signals are received strongly 100-1 to 100-5 excluding the apparatus wherein a Wi-Fi signal is received weakly 100-6 at operation S1510. Meanwhile, the apparatus wherein a Wi-Fi signal is received weakly 100-6 will be described as a specific apparatus in FIG. 15.

The server 300 may determine whether the apparatus wherein a Wi-Fi signal is received weakly 100-6 includes a BLE communication module and can perform BLE communication at operation S1515. If the apparatus wherein a Wi-Fi signal is received weakly 100-6 includes a BLE communication module, the server 300 may perform control such that the BLE network 1000 is constituted to include the apparatus wherein a Wi-Fi signal is received weakly 100-6 at operation S1520.

However, if the apparatus wherein a Wi-Fi signal is received weakly 100-6 does not include a BLE communication module, the server 300 may identify whether an electronic apparatus that can perform Wi-Fi communication exists among the apparatuses adjacent to the apparatus wherein a Wi-Fi signal is received weakly 100-6 in the BLE network 1000 at operation S1525.

If an electronic apparatus that can perform Wi-Fi communication 100-5 exists among the apparatuses adjacent to the apparatus wherein a Wi-Fi signal is received weakly 100-6, the server 300 may perform control such that the electronic apparatus that can perform Wi-Fi communication 100-5 and the apparatus wherein a Wi-Fi signal is received weakly 100-6 can communicate with each other by using a Wi-Fi direct technology at operation S1530.

If an electronic apparatus that can perform Wi-Fi communication 100-5 does not exist among the apparatuses adjacent to the apparatus wherein a Wi-Fi signal is received weakly 100-6, a user may perform communication between the server 300 and the apparatus wherein a Wi-Fi signal is received weakly 100-6 by using a Wi-Fi signal extender at operation S1535. A Wi-Fi signal extender means a separate hardware component, and a user may have to directly install it in an area wherein a Wi-Fi signal is weak.

Figure 16:
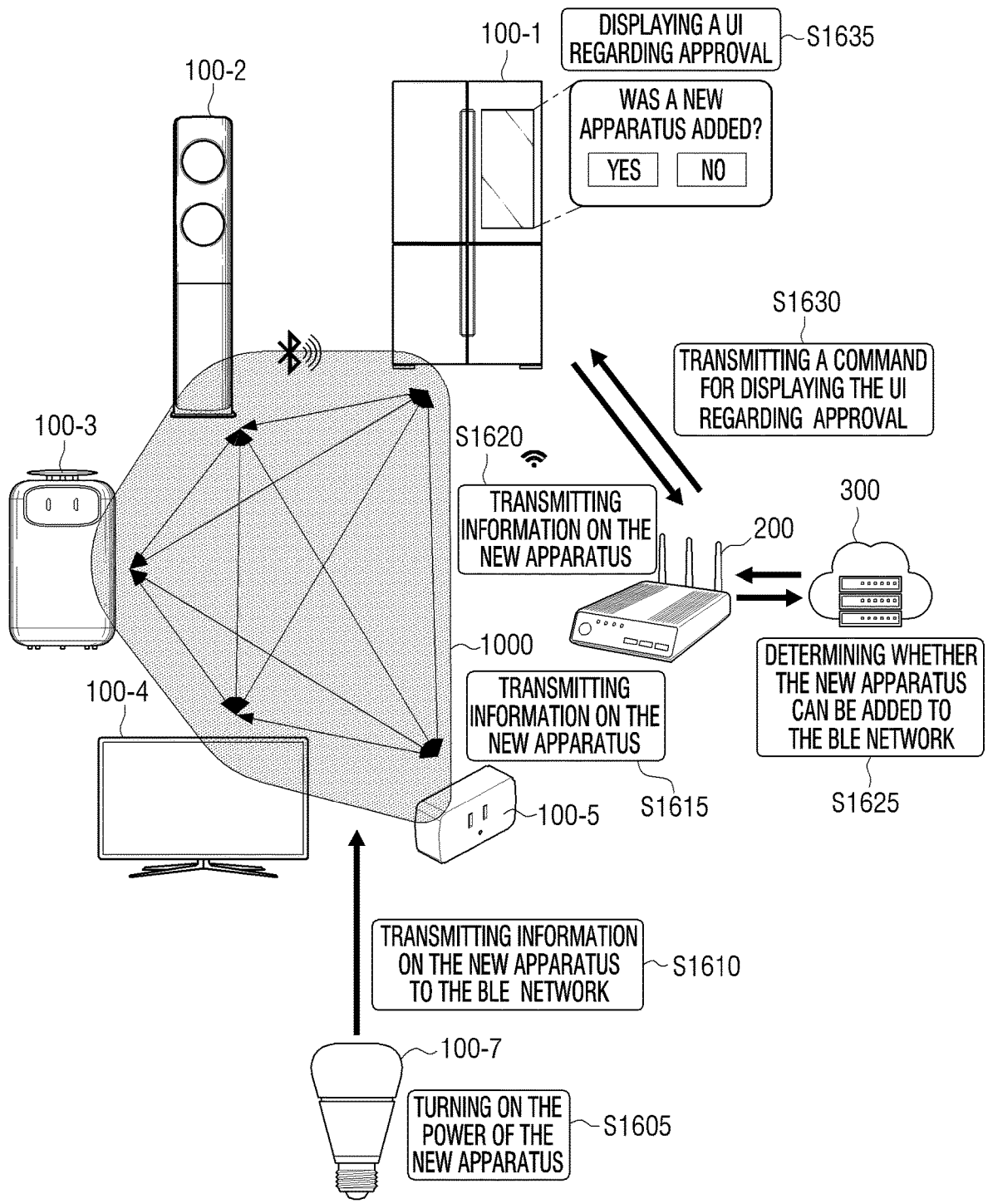
FIG. 16 is a diagram for illustrating a method of adding a new apparatus in case a new electronic apparatus is recognized according to an embodiment of the disclosure.

FIG. 16 is a diagram for illustrating a method of adding a new apparatus in case a new electronic apparatus is recognized according to an embodiment of the disclosure.

Referring to FIG. 16, the server 300 may determine whether to add a new apparatus to the BLE network 1000 in case a new apparatus 100-7 is recognized in the BLE network 1000. Here, the new apparatus 100-7 may be an apparatus including a BLE communication module.

Here, as an example, the new apparatus 100-7 may include a BLE communication module but not include a separate communication module. Here, the new apparatus 100-7 may communicate with other apparatuses only by using a BLE communication module. In a network of the related art using Wi-Fi (the embodiment in FIG. 1), it may be difficult to include the new apparatus 100-7 including only a BLE communication module in the network of the related art. However, as the disclosure constitutes the BLE network 1000, the new apparatus 100-7 including only a BLE communication module may be easily added to the BLE network 1000. As another example, the new apparatus 100-7 may be implemented in a form of including a BLE communication module and other communication modules. Meanwhile, as the new apparatus 100-7 includes a BLE communication module, the new apparatus 100-7 may be added to the BLE network 1000.

When the power of the new apparatus 100-7 is turned on, the BLE function included in the new apparatus 100-7 may be changed to an on state at operation S1605. Thereafter, the new apparatus 100-7 may transmit information on the new apparatus 100-7 to the BLE network 1000 by using a BLE signal at operation S1610. Thereafter, the BLE network 1000 may share the information on the new apparatus 100-7 at operation S1615. Thereafter, the main apparatus 100-1 may transmit the information on the new apparatus 100-7 to the AP apparatus 200 at operation S1620. Thereafter, the AP apparatus 200 may transmit the information on the new apparatus 100-7 to the server 300.

The server 300 may determine whether the new apparatus 100-7 can be added to the BLE network 1000 based on the received information on the new apparatus 100-7 at operation S1625. A specific standard for determination may be a list of electronic apparatuses that can be added to the BLE network 1000 stored in the memory of the server 300. A list of electronic apparatuses of which stability has been secured even if they are added to the BLE network 1000 may be stored in advance in the server 300.

In case it is determined that the new apparatus 100-7 can be added to the BLE network 1000, the server 300 may transmit a control command for displaying a UI regarding approval to the plurality of electronic apparatuses 100-1 to 100-6 through the AP apparatus 200 at operation S1630. The main apparatus 100-1 that received the control command from the AP apparatus 200 may identify an electronic apparatus including a display among the plurality of electronic apparatuses 100-1 to 100-6, and transmit the control command to the electronic apparatus including a display. Thereafter, the electronic apparatus that received the control command may display a UI regarding approval on the display at operation S1635. In FIG. 16, the electronic apparatus including a display was described as the main apparatus 100-1, but depending on embodiments of the disclosure, it may be another electronic apparatus which is not the main apparatus 100-1.

In addition, while FIG. 16 described an operation of displaying a UI regarding approval, depending on embodiments of the disclosure, the disclosure may be implemented such that the new apparatus 100-7 is added to the BLE network 1000 automatically without displaying a UI regarding approval.

Figure 17:
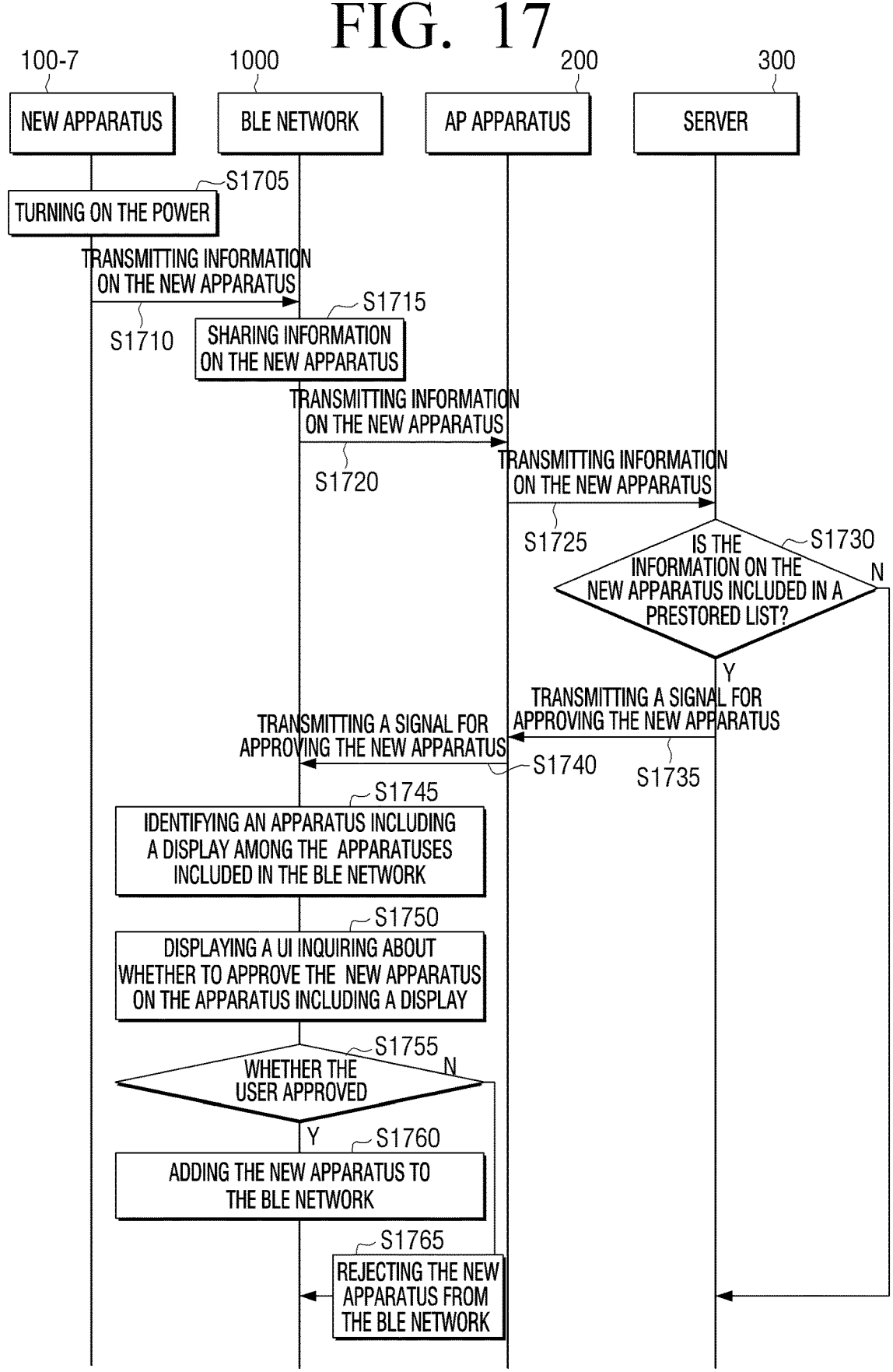
FIG. 17 is a sequence diagram for illustrating an operation performed in FIG. 16 according to an embodiment of the disclosure.

FIG. 17 is a sequence diagram for illustrating an operation performed in FIG. 16 according to an embodiment of the disclosure.

Referring to FIG. 17, a case wherein the power of the new apparatus 100-7 is turned on is assumed at operation S1705. The new apparatus 100-7 may transmit information on the new apparatus 100-7 to the BLE network 1000 by using a BLE communication module at operation S1710. In addition, the BLE network 1000 may share the information on the new apparatus 100-7 at operation S1715. Thereafter, the main apparatus 100-1 among the electronic apparatuses included in the BLE network 1000 may transmit the information on the new apparatus 100-7 to the AP apparatus 200 at operation S1720. Thereafter, the AP apparatus 200 may transmit the information on the new apparatus 100-7 to the server 300 at operation S1725.

The server 300 may identify whether the received information on the new apparatus 100-7 is included in a prestored list. Here, the prestored list may mean data stored which is a result of determining in advance whether an electronic apparatus can be added to the BLE network 1000. If the information on the new apparatus 100-7 is not included in the prestored list, the server 300 may perform control such that the new apparatus 100-7 is not added to the BLE network 1000.

If the information on the new apparatus 100-7 is included in the prestored list, the server 300 may generate a control signal that the new apparatus 100-7 can be added, and transmit the generated control signal to the AP apparatus 200 at operation S1735. Thereafter, the AP apparatus 200 may transmit the generated control signal to the main apparatus 100-1 at operation S1740.

As an example, the main apparatus 100-1 may perform control such that the new apparatus 100-7 is automatically added to the BLE network 1000 based on the received control signal.

As another example, the main apparatus 100-1 may display a UI inquiring about approval based on the received control signal. Specifically, the main apparatus 100-1 may identify an electronic apparatus including a display among the plurality of electronic apparatuses connected to the BLE network at operation S1745.

In addition, the main apparatus 100-1 may transmit a control command for displaying a UI inquiring about whether to approve a new apparatus to the identified electronic apparatus including a display. Here, a control command for displaying a UI inquiring about whether to approve a new apparatus may be included in a new apparatus approval signal received from the server 300.

The identified electronic apparatus including a display may receive the control command and display a UI inquiring about whether to approve a new apparatus on the display at operation S1750. The user may determine whether to add the new apparatus 100-7 to the BLE network 1000 through the UI.

If an input approving addition of the new apparatus 100-7 is received at operation S1755, the identified electronic apparatus including a display may perform control such that the new apparatus 100-7 is added to the BLE network 1000 at operation S1760.

If an input refusing addition of the new apparatus 100-7 is received, the identified electronic apparatus including a display may perform control such that the new apparatus 100-7 is refused by the BLE network 1000 at operation S1765.

Figure 18:
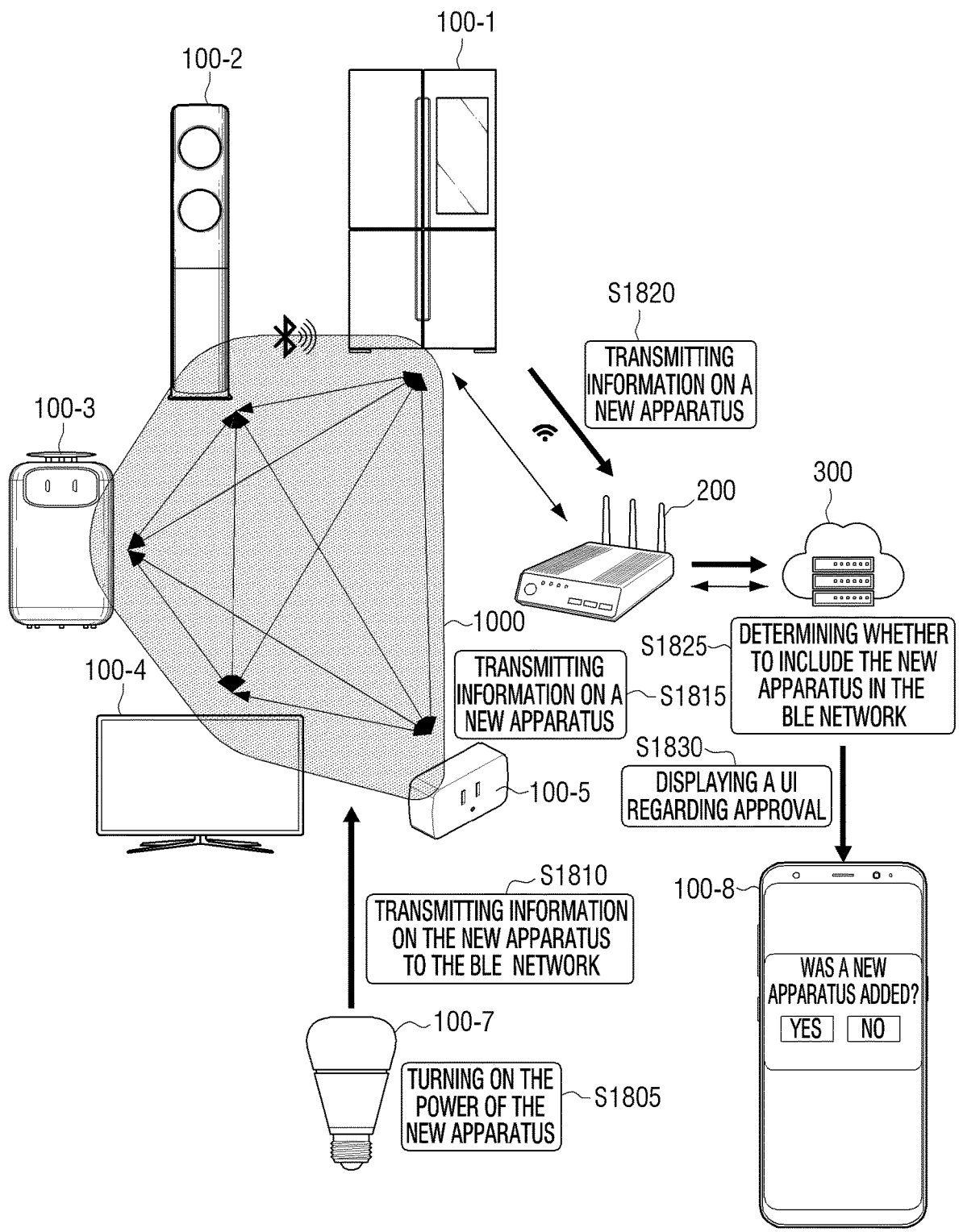
FIG. 18 is a diagram for illustrating a method of adding a new apparatus in case a new electronic apparatus is recognized according to an embodiment of the disclosure.

FIG. 18 is a diagram for illustrating a method of adding a new apparatus in case a new electronic apparatus is recognized according to an embodiment of the disclosure.

Referring to FIG. 18, the operations S1805, S1810, S1815, S1820, and S1825 may correspond to the operations S1605, S1610, S1615, S1620, and S1625 in FIG. 16. Accordingly, overlapping explanation will be omitted.

In case it is determined that the new apparatus 100-7 can be added to the BLE network 1000, the server 300 may perform control such that a UI inquiring about approval of addition of the new apparatus 100-7 is displayed on a user terminal apparatus 100-8 at operation S1830. Specifically, the server 300 may perform control such that a UI is displayed on a separate user terminal apparatus 100-8 but not on an electronic apparatus included in the BLE network 1000, unlike in the embodiment in FIG. 16.

The server 300 may generate a control command for displaying a UI inquiring about approval of addition of the new apparatus 100-7, and transmit the generated control command to the user terminal apparatus 100-8. Thereafter, the user terminal apparatus 100-8 may display the UI inquiring about approval of addition of the new apparatus 100-7 on the display based on the received control command.

Figure 19:
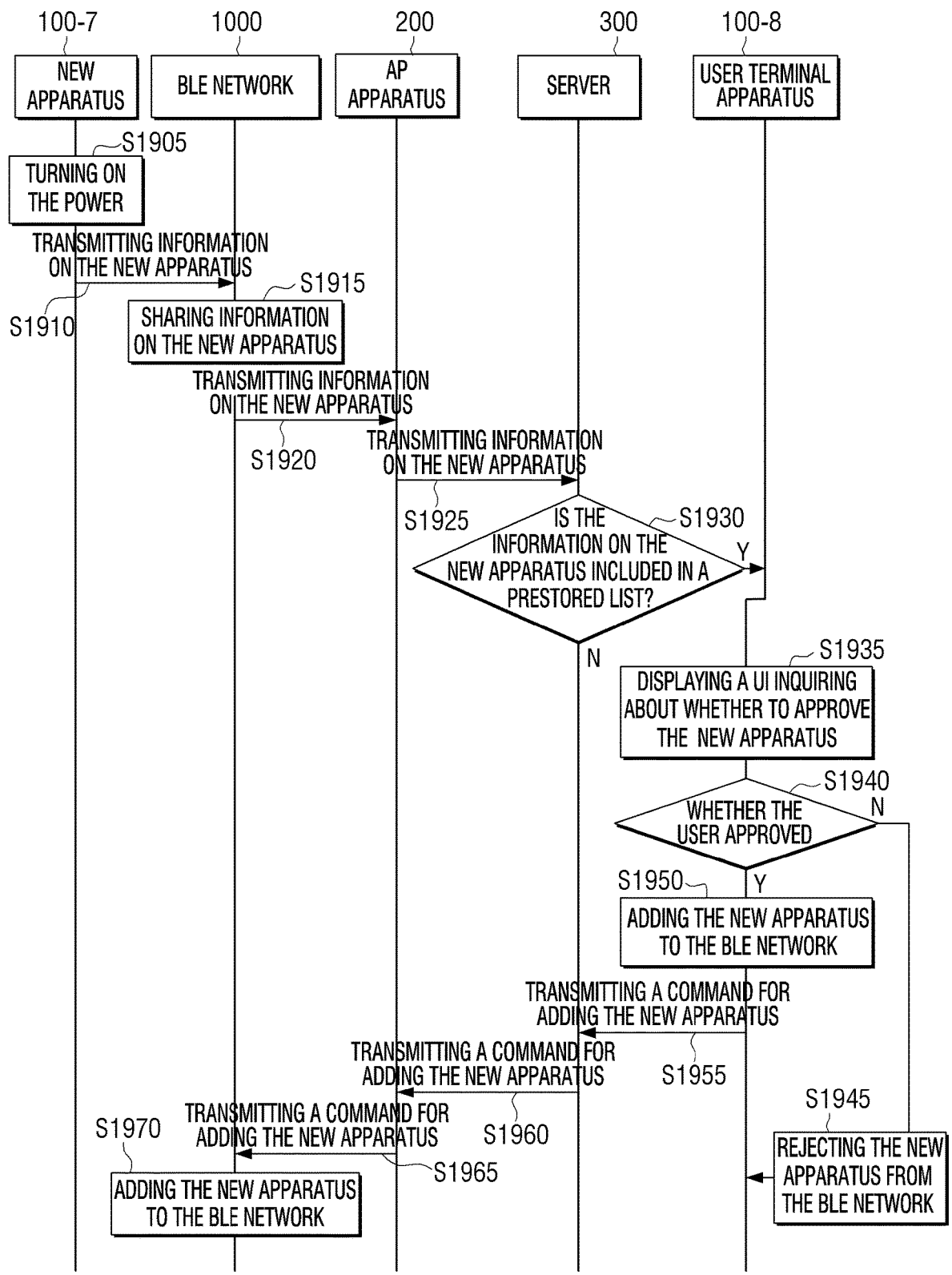
FIG. 19 is a sequence diagram for illustrating an operation performed in FIG. 18 according to an embodiment of the disclosure.

FIG. 19 is a sequence diagram for illustrating an operation performed in FIG. 18 according to an embodiment of the disclosure.

Referring to FIG. 19, the operations S1905, S1910, S1915, S1920, S1925, and S1930 may correspond to the operations S1705, S1710, S1715, S1720, S1725, and S1730 in FIG. 17. Accordingly, overlapping explanation will be omitted.

If information on the new apparatus 100-7 is not included in the prestored list, the server 300 may perform control such that the new apparatus 100-7 is not added to the BLE network 1000.

In addition, if information on the new apparatus 100-7 is included in the prestored list, the server 300 may generate a control signal for displaying a UI inquiring about whether to add the new apparatus 100-7, and transmit the generated control command to the user terminal apparatus 100-8. Thereafter, the user terminal apparatus 100-8 may display the UI inquiring about whether to add the new apparatus 100-7 on the display based on the received control signal at operation S1935.

If an input refusing addition of the new apparatus 100-7 is received, the user terminal apparatus 100-8 may perform control such that the new apparatus 100-7 is not added to the BLE network at operation S1945.

If an input approving addition of the new apparatus 100-7 is received at operation S1940, the user terminal apparatus 100-8 may generate a control command (or a response) for adding the new apparatus 100-7 to the BLE network 1000, and transmit the generated control command to the server 300 at operation S1955. Thereafter, the server 300 may transmit the control command for adding the new apparatus 100-7 to the BLE network 1000 to the AP apparatus 200 at operation S1960. Thereafter, the AP apparatus 200 may transmit the received control command to the main apparatus 100-1 at operation S1965. Thereafter, the main apparatus 100-1 may perform control such that the new apparatus 100-7 is added to the BLE network 1000 based on the received control command at operation S1970.

Figure 20:
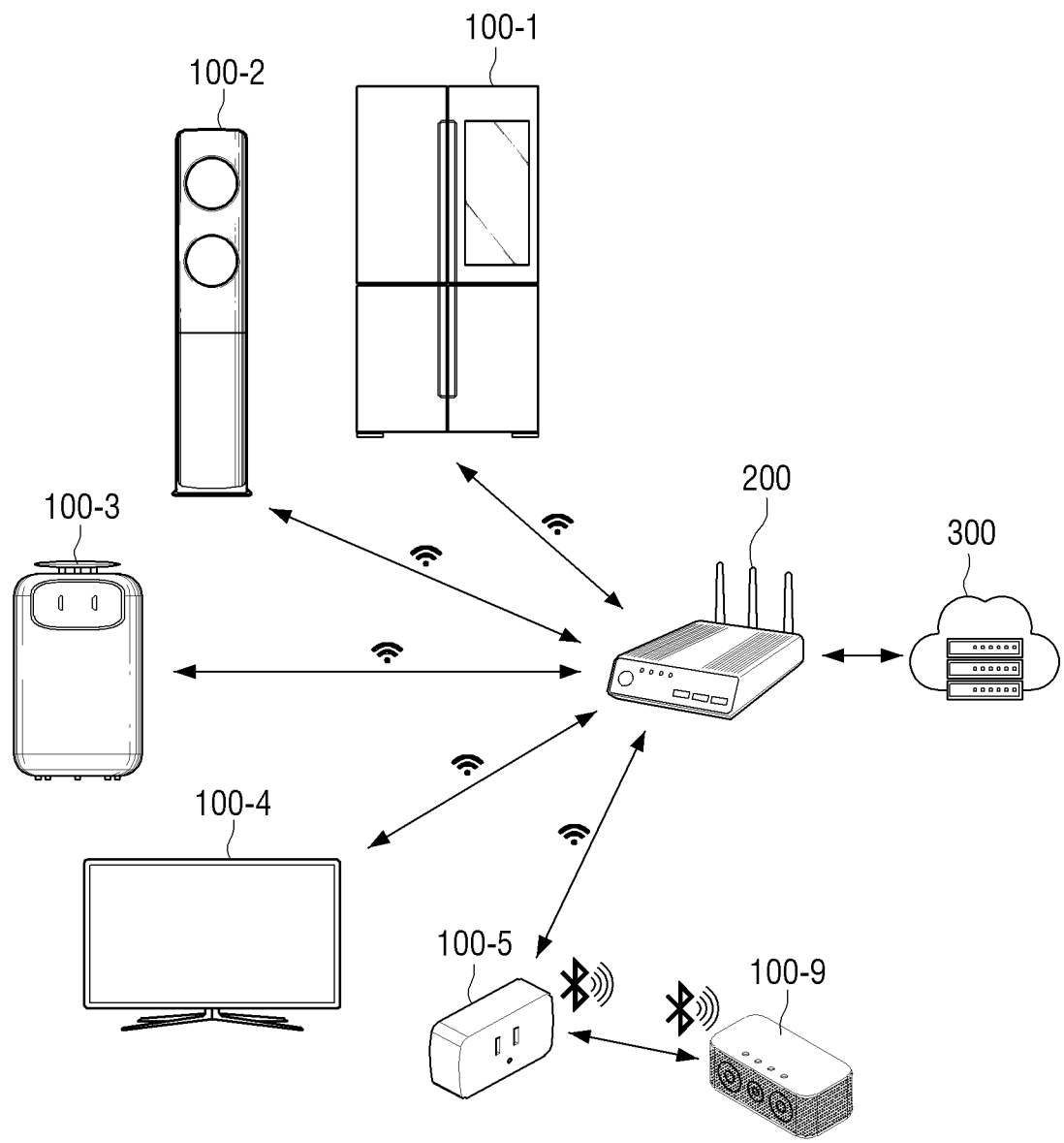
FIG. 20 is a diagram for illustrating a method for remote controlling an electronic apparatus including only a BLE communication module according to an embodiment of the disclosure.

FIG. 20 is a diagram for illustrating a method for remote controlling an electronic apparatus including only a BLE communication module according to an embodiment of the disclosure.

Referring to FIG. 20, a remote control system may include a plurality of electronic apparatuses 100-1 to 100-5, an AP apparatus 200, and a server 300.

Here, an embodiment wherein an electronic apparatus 100-9 including only a BLE communication module is added to the remote control system is assumed. The electronic apparatus 100-9 including only a BLE communication module can communicate with other electronic apparatuses only by using a BLE technology.

However, as a remote control system of the related art forms a communication network through Wi-Fi, it would be rather difficult to add the electronic apparatus 100-9 including only a BLE communication module.

However, the disclosure may control the electronic apparatus 100-9 including only a BLE communication module in a remote control system of the related art forming a communication network through Wi-Fi. Specifically, a remote control system may identify an electronic apparatus including a BLE communication module in a communication network of the related art using Wi-Fi. Here, it is assumed that the identified electronic apparatus is 100-5. As the identified electronic apparatus 100-5 was already communicating with the AP apparatus 200 by a Wi-Fi method, the electronic apparatus may include both of a Wi-Fi communication module and a BLE communication module.

Specifically, the identified electronic apparatus 100-5 may communicate with the electronic apparatus 100-9 including only a BLE communication module by using a BLE communication module.

In case the server 300 aims to control the electronic apparatus 100-9 including only a BLE communication module, the server 300 may transmit a control command to the AP apparatus 200. Thereafter, the AP apparatus 200 may transmit the control command to the identified electronic apparatus 100-5 by using a Wi-Fi method. Thereafter, the identified electronic apparatus 100-5 may transmit the control command to the electronic apparatus 100-9 including only a BLE communication module by using a BLE method.

In case the electronic apparatus 100-9 including only a BLE communication module transmits information to the identified electronic apparatus 100-5, the electronic apparatus 100-9 including only a BLE communication module may transmit information to the identified electronic apparatus 100-5 by using a BLE method. Thereafter, the identified electronic apparatus 100-5 may transmit the received information to the AP apparatus 200 by using a Wi-Fi method.

Thereafter, the AP apparatus 200 may transmit the received information to the server 300.

The disclosure may also additionally control the electronic apparatus 100-9 including only a BLE communication module in a communication network of the related art using a Wi-Fi method.

Figure 21:
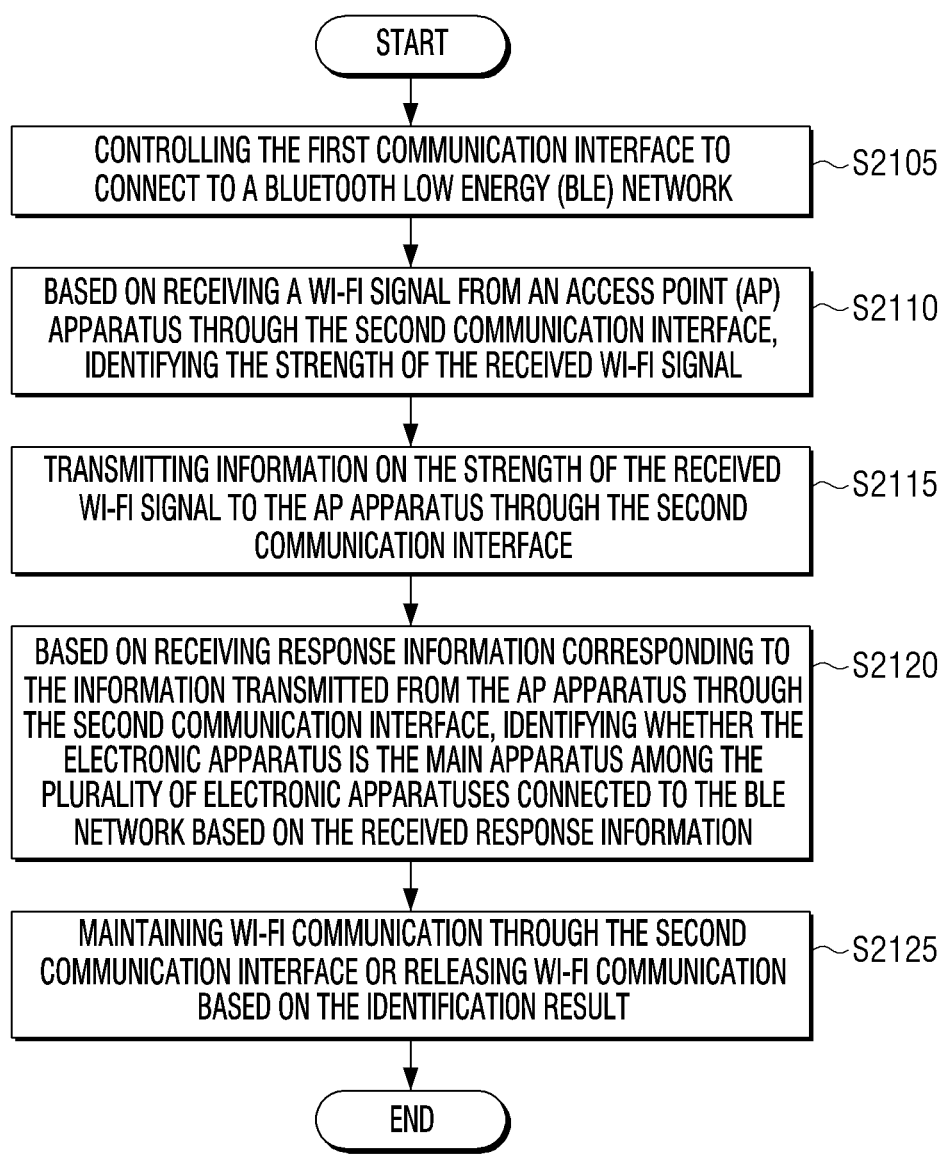
FIG. 21 is a flowchart for illustrating a controlling method of an electronic apparatus according to an embodiment of the disclosure.

FIG. 21 is a flowchart for illustrating a controlling method of an electronic apparatus according to an embodiment of the disclosure.

Referring to FIG. 21, a controlling method of an electronic apparatus according to an embodiment of the disclosure may include the operations of controlling the first communication interface 111 to connect to a Bluetooth™ Low Energy (BLE) network in operation 2105, based on receiving a Wi-Fi signal from an access point (AP) apparatus through the second communication interface 112, identifying the strength of the received Wi-Fi signal in operation 2110, transmitting information on the strength of the received Wi-Fi signal to the AP apparatus through the second communication interface 112 in operation 2115, based on receiving response information corresponding to the information transmitted from the AP apparatus through the second communication interface 112, identifying whether the electronic apparatus is a main apparatus among a plurality of electronic apparatuses connected to the BLE network based on the received response information in operation 2120, and maintaining Wi-Fi communication through the second communication interface 112 or releasing the Wi-Fi communication based on the identification result in operation 2125.

Here, the response information may include information indicating that each of the plurality of electronic apparatuses that transmitted the information on the strength of the Wi-Fi signal to the AP apparatus is a main apparatus or a sub apparatus. In addition, in an operation of maintaining Wi-Fi communication or releasing Wi-Fi communication, if the electronic apparatus is the main apparatus among the plurality of electronic apparatuses, the Wi-Fi communication may be maintained, and if the electronic apparatus is the sub apparatus among the plurality of electronic apparatuses, the Wi-Fi communication may be released.

Here, the main apparatus may be any one of a refrigerator, an air conditioning apparatus, an image outputting apparatus, a smart plug, or a smart bulb, and it may be determined based on at least one of information on the strength of a Wi-Fi signal or information on the standby power.

Meanwhile, in the controlling method, while Wi-Fi connection through the second communication interface 112 is maintained based on the identification result, a control signal received through the AP apparatus may be transmitted to at least one of the plurality of electronic apparatuses through the first communication interface 111.

In addition, in the controlling method of an electronic apparatus storing identification information for each of a plurality of electronic apparatuses, if an external apparatus for which identification information is not stored is identified in the BLE network, it may be determined whether to add the identified external apparatus to the BLE network.

Here, in the controlling method, the display 130 may be controlled to display a guide UI for adding the identified external apparatus to the BLE network.

In addition, in the controlling method, information on the identified external apparatus may be transmitted to the AP apparatus through the second communication interface 112, and if a control signal for displaying a guide UI for adding the identified external apparatus to the BLE network is received from the AP apparatus, the display 130 may be controlled to display the guide UI.

In addition, in the controlling method, a first signal controlling to display a guide UI for adding the identified external apparatus to the BLE network may be transmitted to an apparatus including a display among the plurality of electronic apparatuses through the first communication interface 111, and if a second signal instructing to add the identified external apparatus to the BLE network is received from the apparatus including a display through the first communication interface 111, the external apparatus may be added to the BLE network, and identification information on the external apparatus may be transmitted to the AP apparatus through the second communication interface 112.

Meanwhile, in the controlling method, while Wi-Fi connection through the second communication interface 112 is maintained based on the identification result, if a control signal making one of the plurality of electronic apparatuses communicatively connected with an external apparatus not connected to the BLE network through Wi-Fi direct is received from the AP apparatus, the control signal may be transmitted to one of the plurality of electronic apparatuses through the first communication interface 111.

Here, one of the plurality of electronic apparatuses may be an apparatus located to be adjacent to one of the external apparatuses.

Meanwhile, the controlling method of an electronic apparatus as in FIG. 21 may be executed on an electronic apparatus having the configuration as in FIG. 5 or FIG. 6, and it may also be executed on electronic apparatuses having different configurations.

Meanwhile, methods according to the aforementioned various embodiments of the disclosure may be implemented in forms of applications that can be installed on electronic apparatuses of the related art.

In addition, methods according to the aforementioned various embodiments of the disclosure may be implemented just by software upgrade, or hardware upgrade of electronic apparatuses of the related art.

In addition, it is possible that the aforementioned various embodiments of the disclosure are performed through an embedded server provided on an electronic apparatus, or at least one external server of an electronic apparatus or a display apparatus.

Meanwhile, according to an embodiment of the disclosure, the various embodiments described above may be implemented as software including instructions stored in machine-readable storage media, which can be read by machines (e.g., computers). Here, the machines refer to apparatuses that call instructions stored in a storage medium, and can operate according to the called instructions, and the apparatuses may include the electronic apparatus according to the aforementioned embodiments (e.g., an electronic apparatus A). In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'non-transitory' only means that a storage medium does not include signals, and is tangible, but does not indicate whether data is stored in the storage medium semi-permanently or temporarily.

In addition, according to an embodiment of the disclosure, methods according to the aforementioned various embodiments of the disclosure may be provided while being included in a computer program product. A computer program product refers to a product, and it can be traded between a seller and a buyer. A computer program product can be distributed on-line in the form of a storage medium that is readable by machines (e.g., a compact disc read only memory (CD-ROM)), or through an application store (e.g., Play Store™). In the case of on-line distribution, at least a portion of a computer program product may be stored in a storage medium, such as the server of the manufacturer, the server of the application store, and the memory of the relay server at least temporarily, or may be generated temporarily.

In addition, each of the components according to the aforementioned various embodiments (e.g., a module or a program) may include a singular object or a plurality of objects. In addition, among the aforementioned corresponding sub components, some sub components may be omitted, or other sub components may be further included in the various embodiments. Generally or additionally, some components (e.g., a module or a program) may be integrated as an object, and perform the functions that were performed by each of the components before integration identically or in a similar manner. A module, a program, or operations performed by other components according to the various embodiments may be executed sequentially, in parallel, repetitively, or heuristically. Or, at least some of the operations may be executed in a different order or omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic apparatus comprising:
a first communication interface;
a second communication interface; and
a processor configured to:
control the first communication interface to connect to a Bluetooth™ low energy (BLE) network,
based on receiving a wireless fidelity (Wi-Fi) signal from an access point (AP) apparatus through the second communication interface, identify a strength of the received Wi-Fi signal,
transmit information on the strength of the received Wi-Fi signal to the AP apparatus through the second communication interface,
based on receiving response information corresponding to information transmitted from the AP apparatus through the second communication interface, identify whether the electronic apparatus is a main apparatus among a plurality of electronic apparatuses connected to the BLE network based on the received response information and based on a result of the identified strength of the received Wi-Fi signal,
based on identifying that the electronic apparatus is the main apparatus, maintain Wi-Fi communication through the second communication interface, and
based on identifying that the electronic apparatus is a sub apparatus, release the Wi-Fi communication.

2. The electronic apparatus of claim 1,
wherein the response information includes information indicating that each of the plurality of electronic apparatuses that transmitted the information on the strength of the Wi-Fi signal to the AP apparatus is the main apparatus or a sub apparatus, and wherein the processor is further configured to:
based on the electronic apparatus being the main apparatus among the plurality of electronic apparatuses, maintain the Wi-Fi communication, and based on the electronic apparatus being the sub apparatus among the plurality of electronic apparatuses, release the Wi-Fi communication.

3. The electronic apparatus of claim 2,
wherein the main apparatus is any one of a refrigerator, an air conditioning apparatus, an image outputting apparatus, a smart plug, or a smart bulb, and
wherein the main apparatus is determined based on at least one of information on the strength of a Wi-Fi signal or information on standby power.

4. The electronic apparatus of claim 1,
wherein the processor is further configured to:
while Wi-Fi connection through the second communication interface is maintained based on the identification result, transmit a control signal received through the AP apparatus to at least one of the plurality of electronic apparatuses through the first communication interface.

5. The electronic apparatus of claim 1, further comprising:
a memory storing identification information for each of the plurality of electronic apparatuses,
wherein the processor is further configured to:
based on an external apparatus, for which the identification information is not stored in the memory, being identified in the BLE network, determine whether to add the identified external apparatus to the BLE network.

6. The electronic apparatus of claim 5, further comprising:
a display,
wherein the processor is further configured to:
control the display to display a guide user interface (UI) for adding the identified external apparatus to the BLE network.

7. The electronic apparatus of claim 5, further comprising:
a display,
wherein the processor is further configured to:
transmit information on the identified external apparatus to the AP apparatus through the second communication interface, and
based on a control signal for displaying a guide UI for adding the identified external apparatus to the BLE network being received from the AP apparatus, control the display to display the guide UI.

8. The electronic apparatus of claim 5,
wherein the processor is further configured to:
transmit a first signal controlling to display a guide UI for adding the identified external apparatus to the BLE network to an apparatus including a display among the plurality of electronic apparatuses through the first communication interface, and
based on a second signal instructing to add the identified external apparatus to the BLE network being received from the apparatus including a display through the first communication interface, add the external apparatus to the BLE network and transmit identification information for the external apparatus to the AP apparatus through the second communication interface.

9. The electronic apparatus of claim 1,
wherein the processor is further configured to:
while Wi-Fi connection through the second communication interface is maintained based on the identification result, based on a control signal making one of the plurality of electronic apparatuses communicatively connected with an external apparatus not connected to the BLE network through Wi-Fi direct being received from the AP apparatus, transmit the control signal to one of the plurality of electronic apparatuses through the first communication interface.

10. The electronic apparatus of claim 9,
wherein one of the plurality of electronic apparatuses is an apparatus located to be adjacent to the external apparatus.

11. A controlling method of an electronic apparatus, the method comprising:
controlling a first communication interface to connect to a Bluetooth™ low energy (BLE) network;
based on receiving a wireless fidelity (Wi-Fi) signal from an access point (AP) apparatus through a second communication interface, identifying a strength of the received Wi-Fi signal;
transmitting information on the strength of the received Wi-Fi signal to the AP apparatus through the second communication interface;
based on receiving response information corresponding to information transmitted from the AP apparatus through the second communication interface, identifying whether the electronic apparatus is a main apparatus among a plurality of electronic apparatuses connected to the BLE network based on the received response information and based on a result of the identified strength of the received Wi-Fi signal;
based on identifying that the electronic apparatus is the main apparatus, maintaining Wi-Fi communication through the second communication interface; and
based on identifying that the electronic apparatus is a sub apparatus releasing the Wi-Fi communication.

12. The method of claim 11,
wherein the response information includes information indicating that each of the plurality of electronic apparatuses that transmitted the information on the strength of the Wi-Fi signal to the AP apparatus is the main apparatus or a sub apparatus, and
wherein the maintaining of the Wi-Fi communication or the releasing of the Wi-Fi communication comprises:
based on the electronic apparatus being the main apparatus among the plurality of electronic apparatuses, maintaining the Wi-Fi communication, and based on the electronic apparatus being the sub apparatus among the plurality of electronic apparatuses, releasing the Wi-Fi communication.

13. The method of claim 12,
wherein the main apparatus is any one of a refrigerator, an air conditioning apparatus, an image outputting apparatus, a smart plug, or a smart bulb, and
wherein the main apparatus is determined based on at least one of information on the strength of a Wi-Fi signal or information on standby power.

14. The method of claim 11, further comprising:
while Wi-Fi connection through the second communication interface is maintained based on the identification result, transmitting a control signal received through the AP apparatus to at least one of the plurality of electronic apparatuses through the first communication interface.

15. The method of claim 11, further comprising:
based on an external apparatus, for which identification information is not stored, being identified in the BLE network, determining whether to add the identified external apparatus to the BLE network.

16. The method of claim 15, further comprising:
controlling a display to display a guide UI for adding the identified external apparatus to the BLE network.

17. The method of claim 15, further comprising:
transmitting information on the identified external apparatus to the AP apparatus through the second communication interface; and
based on a control signal for displaying a guide UI for adding the identified external apparatus to the BLE network being received from the AP apparatus, controlling the display to display the guide UI.

18. The method of claim 15, further comprising:
transmitting a first signal controlling to display a guide UI for adding the identified external apparatus to the BLE network to an apparatus including a display among the plurality of electronic apparatuses through the first communication interface; and
based on a second signal instructing to add the identified external apparatus to the BLE network being received from the apparatus including a display through the first communication interface, adding the external apparatus to the BLE network and transmitting identification information for the external apparatus to the AP apparatus through the second communication interface.

19. The method of claim 11, further comprising:
while Wi-Fi connection through the second communication interface is maintained based on the identification result, based on a control signal making one of the plurality of electronic apparatuses communicatively connected with an external apparatus not connected to the BLE network through Wi-Fi direct being received from the AP apparatus, transmitting the control signal to one of the plurality of electronic apparatuses through the first communication interface.

20. The method of claim 19,
wherein one of the plurality of electronic apparatuses is an apparatus located to be adjacent to the external apparatus.

21. The method of claim 12, further comprising:
receiving, by the sub apparatus, a control signal of a server through the main apparatus or transmitting information through the main apparatus.

22. The method of claim 12, further comprising:
communicating, by the main apparatus, with the sub apparatus by using a BLE signal.

* * * * *